United States Patent
Shukla et al.

(10) Patent No.: US 8,255,496 B2
(45) Date of Patent: Aug. 28, 2012

(54) METHOD AND APPARATUS FOR DETERMINING A NETWORK TOPOLOGY DURING NETWORK PROVISIONING

(75) Inventors: Amit Shukla, Sunnyvale, CA (US); Arthi Ayyangar, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 483 days.

(21) Appl. No.: 12/346,623

(22) Filed: Dec. 30, 2008

(65) Prior Publication Data
US 2010/0169467 A1 Jul. 1, 2010

(51) Int. Cl.
*G06F 15/177* (2006.01)
(52) U.S. Cl. .................. 709/220; 709/238; 718/104
(58) Field of Classification Search ............ 709/220, 709/238; 718/1, 10
See application file for complete search history.

(56) References Cited

U.S. PATENT DOCUMENTS

| | | | |
|---|---|---|---|
| 5,138,615 A | 8/1992 | Lamport et al. |
| 5,801,641 A | 9/1998 | Yang et al. |
| 6,073,089 A | 6/2000 | Baker et al. |
| 6,522,627 B1 | 2/2003 | Mauger |
| 6,633,548 B2 | 10/2003 | Bachmutsky et al. |
| 6,657,962 B1 | 12/2003 | Barri et al. |
| 6,775,230 B1 | 8/2004 | Watanabe et al. |
| 6,807,172 B1 | 10/2004 | Levenson et al. |
| 6,970,902 B1 | 11/2005 | Moon |
| 6,985,486 B1 | 1/2006 | Agrawal |
| 7,027,412 B2 | 4/2006 | Miyamoto et al. |
| 7,069,413 B1 | 6/2006 | Agesen et al. |
| 7,075,934 B2 | 7/2006 | Chiussi et al. |
| 7,221,676 B2 | 5/2007 | Green et al. |
| 7,313,135 B2 | 12/2007 | Wyatt |
| 7,327,680 B1 | 2/2008 | Kloth |
| 7,369,561 B2 | 5/2008 | Wybenga et al. |
| 7,406,038 B1 | 7/2008 | Oelke et al. |
| 7,409,487 B1 | 8/2008 | Chen et al. |
| 7,415,034 B2 | 8/2008 | Muller et al. |
| 7,428,219 B2 | 9/2008 | Khosravi |
| 7,430,164 B2 | 9/2008 | Bare |
| 7,441,268 B2 | 10/2008 | Remedios |
| 7,630,368 B2 | 12/2009 | Tripathi et al. |

(Continued)

FOREIGN PATENT DOCUMENTS

EP 0 809 380 A2 11/1997

(Continued)

OTHER PUBLICATIONS

U.S. Appl. No. 12/346,608, filed Dec. 30, 2008, entitled "Methods and Apparatus Related to Data Transmissions Between Virtual Resources Via A Network Device" (80 pgs).

(Continued)

Primary Examiner — Thomas Dailey
(74) Attorney, Agent, or Firm — Cooley LLP

(57) ABSTRACT

In one embodiment, a method includes receiving a provisioning instruction including a device identifier from an external management entity, receiving the device identifier from a network device, associating the provisioning instruction the network device, and sending a portion of the provisioning instruction to the network device. The device identifier being associated with a virtual resource. The associating is based on the device identifier of the virtual resource and a device identifier of a network device. The portion of the provisioning instruction is sent to the network device based on the associating.

28 Claims, 11 Drawing Sheets

U.S. PATENT DOCUMENTS

| | | | |
|---|---|---|---|
| 7,738,457 B2 | 6/2010 | Nordmark et al. | |
| 7,757,059 B1 | 7/2010 | Ofer et al. | |
| 7,788,411 B2 | 8/2010 | Belgaied et al. | |
| 7,836,212 B2 | 11/2010 | Tripathi et al. | |
| 2002/0118644 A1 | 8/2002 | Moir | |
| 2002/0194294 A1 | 12/2002 | Blumenau et al. | |
| 2003/0026287 A1 | 2/2003 | Mullendore et al. | |
| 2003/0065878 A1 | 4/2003 | Krishna et al. | |
| 2003/0142668 A1 | 7/2003 | Wyatt | |
| 2004/0177157 A1 | 9/2004 | Mistry et al. | |
| 2004/0205253 A1 | 10/2004 | Arndt et al. | |
| 2005/0192969 A1 | 9/2005 | Haga et al. | |
| 2005/0198303 A1 | 9/2005 | Knauerhase et al. | |
| 2006/0259952 A1 | 11/2006 | Lok | |
| 2007/0005685 A1 | 1/2007 | Chau et al. | |
| 2007/0008949 A1 | 1/2007 | Balandin | |
| 2007/0078988 A1 | 4/2007 | Miloushev et al. | |
| 2007/0079307 A1* | 4/2007 | Dhawan et al. | 718/1 |
| 2007/0140235 A1 | 6/2007 | Aysan et al. | |
| 2007/0204265 A1 | 8/2007 | Oshins | |
| 2007/0211716 A1 | 9/2007 | Oz et al. | |
| 2007/0219911 A1 | 9/2007 | Abe | |
| 2007/0244997 A1 | 10/2007 | Tindal | |
| 2007/0280243 A1* | 12/2007 | Wray et al. | 370/392 |
| 2007/0280253 A1 | 12/2007 | Rooholamini et al. | |
| 2007/0297428 A1 | 12/2007 | Bose et al. | |
| 2008/0002663 A1 | 1/2008 | Tripathi et al. | |
| 2008/0005344 A1 | 1/2008 | Ford et al. | |
| 2008/0019365 A1 | 1/2008 | Tripathi et al. | |
| 2008/0043756 A1 | 2/2008 | Droux et al. | |
| 2008/0043765 A1 | 2/2008 | Belgaied et al. | |
| 2008/0046610 A1 | 2/2008 | Tripathi et al. | |
| 2008/0046735 A1 | 2/2008 | Nedeltchev et al. | |
| 2008/0080548 A1 | 4/2008 | Mullendore et al. | |
| 2008/0082977 A1 | 4/2008 | Araujo et al. | |
| 2008/0095361 A1 | 4/2008 | Wifvesson et al. | |
| 2008/0098392 A1* | 4/2008 | Wipfel et al. | 718/1 |
| 2008/0130517 A1 | 6/2008 | Lee et al. | |
| 2008/0148341 A1 | 6/2008 | Ferguson | |
| 2008/0155223 A1* | 6/2008 | Hiltgen et al. | 711/173 |
| 2008/0186875 A1 | 8/2008 | Kitani | |
| 2008/0192648 A1 | 8/2008 | Galles | |
| 2008/0212592 A1 | 9/2008 | Wybenga et al. | |
| 2008/0219184 A1 | 9/2008 | Fowler et al. | |
| 2008/0225853 A1 | 9/2008 | Melman et al. | |
| 2008/0228781 A1 | 9/2008 | Chen et al. | |
| 2008/0240104 A1 | 10/2008 | Villait et al. | |
| 2008/0259934 A1* | 10/2008 | Matthews et al. | 370/395.53 |
| 2009/0013062 A1 | 1/2009 | Blatherwick et al. | |
| 2009/0025007 A1 | 1/2009 | Hara et al. | |
| 2009/0083445 A1 | 3/2009 | Ganga | |
| 2009/0109479 A1 | 4/2009 | Kato | |
| 2009/0135816 A1 | 5/2009 | Nandagopal et al. | |
| 2009/0150529 A1* | 6/2009 | Tripathi | 709/222 |
| 2009/0190598 A1 | 7/2009 | Christensen et al. | |
| 2009/0198761 A1 | 8/2009 | Nanda et al. | |
| 2009/0240790 A1 | 9/2009 | Utsunomiya et al. | |
| 2009/0276772 A1 | 11/2009 | Garrett et al. | |
| 2009/0276774 A1* | 11/2009 | Kinoshita | 718/1 |
| 2009/0292858 A1 | 11/2009 | Lambeth et al. | |
| 2009/0307597 A1 | 12/2009 | Bakman | |
| 2010/0042708 A1 | 2/2010 | Stamler et al. | |
| 2010/0042719 A1 | 2/2010 | Kinoshita | |
| 2010/0043068 A1 | 2/2010 | Varadhan et al. | |
| 2010/0050172 A1 | 2/2010 | Ferris | |
| 2010/0054129 A1 | 3/2010 | Kuik et al. | |
| 2010/0077158 A1 | 3/2010 | Asano | |
| 2010/0091961 A1 | 4/2010 | Jones et al. | |
| 2010/0131636 A1 | 5/2010 | Suri et al. | |
| 2010/0165876 A1 | 7/2010 | Shukla et al. | |
| 2010/0165877 A1 | 7/2010 | Shukla et al. | |
| 2011/0096781 A1 | 4/2011 | Aybay | |
| 2011/0103259 A1 | 5/2011 | Aybay et al. | |

FOREIGN PATENT DOCUMENTS

| | | |
|---|---|---|
| GB | 2 361 139 A | 10/2001 |

OTHER PUBLICATIONS

U.S. Appl. No. 12/346,612, filed Dec. 30, 2008, entitled "Methods and Apparatus Related to Data Transmissions Between Virtual Resources At A Host Device" (78 pgs).

U.S. Appl. No. 12/346,615, filed Dec. 30, 2008, entitled "Methods and Apparatus for Routing Between Virtual Resources Based on a Routing Location Policy" (79 pgs).

U.S. Appl. No. 12/346,618, filed Dec. 30, 2008, entitled "Methods and Apparatus for Provisioning at a Network Device in Response to a Virtual Resource Migration Notification" (80 pgs).

U.S. Appl. No. 12/346,625, filed Dec. 30, 2008, entitled "Methods and Apparatus Related to Managing Communications Between Virtual Resources" (43 pgs).

U.S. Appl. No. 12/612,210, filed Nov. 4, 2009, entitled "Methods and Apparatus for Configuring a Virtual Network Switch" (50 pgs).

Office Action mailed Sep. 17, 2010 for U.S. Appl. No. 12/346,608 (28 pages).

Office Action mailed Sep. 15, 2010 for U.S. Appl. No. 12/346,615 (21 pages).

Office Action mailed Sep. 15, 2010 for U.S. Appl. No. 12/346,618 (13 pages).

Office Action mailed Sep. 17, 2010 for U.S. Appl. No. 12/346,625 (24 pages).

Office Action mailed Oct. 28, 2010 for U.S. Appl. No. 12/346,630 (24 pages).

Office Action mailed Oct. 5, 2010 for U.S. Appl. No. 12/346,632 (16 pages).

Partial European Search Report completed Jan. 25, 2011 for European Application No. 10188736.2 (5 pages).

CISCO: "Cisco VN-Link: Virtualization-Aware Networking," Cisco Public Information, Cisco Systems, [Online] Mar. 1, 2009 (pp. 1-10), XP002593596, Retrieved from the Internet: <URL http://www.cosco.com/en/US/solutions/collateral/ns340/ns517/ns224/ns892/ns894/white_paper_c11-525307.pdf>[retrieved on Jul. 26, 2010].

Final Office Action mailed Aug. 15, 2011 for U.S. Appl. No. 12/346,632 (23 pages).

Final Office Action mailed Jul. 26, 2011 for U.S. Appl. No. 12/346,608 (30 pages).

Office Action mailed Apr. 1, 2011 for U.S. Appl. No. 12/346,612 (19 pages).

Office Action mailed Apr. 14, 2011 for U.S. Appl. No. 12/346,608 (24 pages).

Office Action mailed Apr. 27, 2011 for U.S. Appl. No. 12/346,630 (15 pages).

Office Action mailed Apr. 7, 2011 for U.S. Appl. No. 12/346,618 (14 pages).

Office Action mailed Mar. 14, 2011 for U.S. Appl. No. 12/346,632 (21 pages).

Office Action mailed Mar. 21, 2011 for U.S. Appl. No. 12/346,615 (9 pages).

Office Action mailed Mar. 29, 2011 for U.S. Appl. No. 12/346,625 (13 pages).

Partial European Search Report dated Feb. 4, 2011 for European Application No. 10188736.2 (6 pages).

Partial European Search Report dated Mar. 4, 2011 for European Application No. 10187574.8 (6 pages).

U.S. Appl. No. 12/976,508, filed Dec. 22, 2010, entitled "Methods and Apparatus for Tunnel Management Within a Data Center" (42 pgs).

U.S. Appl. No. 12/981,678, filed Dec. 30, 2010, entitled "Apparatus, Systems and Methods for Aggregate Routes Within a Communications Network" (38 pgs).

* cited by examiner

METHOD AND APPARATUS FOR DETERMINING A NETWORK TOPOLOGY DURING NETWORK PROVISIONING

BACKGROUND

Embodiments described herein relate generally to methods and apparatus for determining a network topology, for example, during network provisioning. Some embodiments relate more specifically to providing centralized topology management of computing resources including virtual resources within a data center that is accessible to external management entities.

Server management tools typically manage and provision computing resources within networks, data centers, and enterprises. For example, network management tools can manage and provision network devices and network resources in a network. Similarly, server management tools can be used to launch applications, manage instantiation and migration of virtual machines, and balance processing loads on servers and/or other computing resources. Network management tools can be used to start and stop network services provided by network devices and set access policies within a network.

Known server management tools and network management tools typically rely on a static description of the network in which the managed resources exist that is provided by a network administrator of the network. For example, a server management tool used to manage servers and/or virtual machines within a network might rely on, for example, an internet protocol ("IP") address for each server or virtual machine being managed that is provided by a network administrator to communicate with the servers in the network. Alternatively, a resource running on a server in the network can dynamically transmit or broadcast the IP address of the server on which it is running. The server management tool can receive and store the broadcast IP address to communicate with that server.

Similarly, known network management tools typically require that a network administrator provide a static description of the topology of the network to a network management tool. Such a static description can include textual and/or other files that describe where (e.g., on which server in the network) particular virtual machines or virtual resources are instantiated. Additionally, a static description can describe the interconnections among network devices such as routers, hubs, switches, and gateways, and the interconnection between these network devices and servers or virtual machines in the network. These network management tools can interpret such a description to apply, for example, an access control list ("ACL") for a particular virtual machine to the port of a network device to which the virtual machine is connected. Alternatively, network devices can be queried dynamically for information about the interconnections of the network devices. For example, the simple network management protocol ("SNMP") provides for some querying and gathering of information from network devices.

Such known methods of server and network management suffer several disadvantages. For example, static descriptions of network topology (including binding of virtual resources to network devices) are problematic in virtualized networks such as data center networks. In a virtualized network, multiple virtual resources such as virtual machines run on a single physical server. Typically in virtualized networks, virtual machines can migrate or move from one server to another within the network, changing dynamically the binding of virtual resources to network devices within the network. Thus, static descriptions of the network quickly become outdated (e.g., inaccurate or incorrect). When the static description of a network is no longer valid due to, for example, migration of a virtual resource, a network administer typically updates the static description of the network in order to provision network devices to manage the network based on the new topology to further manage the network.

SUMMARY OF THE INVENTION

In one embodiment, a method includes receiving a provisioning instruction including a device identifier from an external management entity, receiving the device identifier from a network device, associating the provisioning instruction the network device, and sending a portion of the provisioning instruction to the network device. The device identifier being associated with a virtual resource. The associating is based on the device identifier of the virtual resource and a device identifier of a network device. The portion of the provisioning instruction is sent to the network device based on the associating.

DETAILED DESCRIPTION

Figure 1:
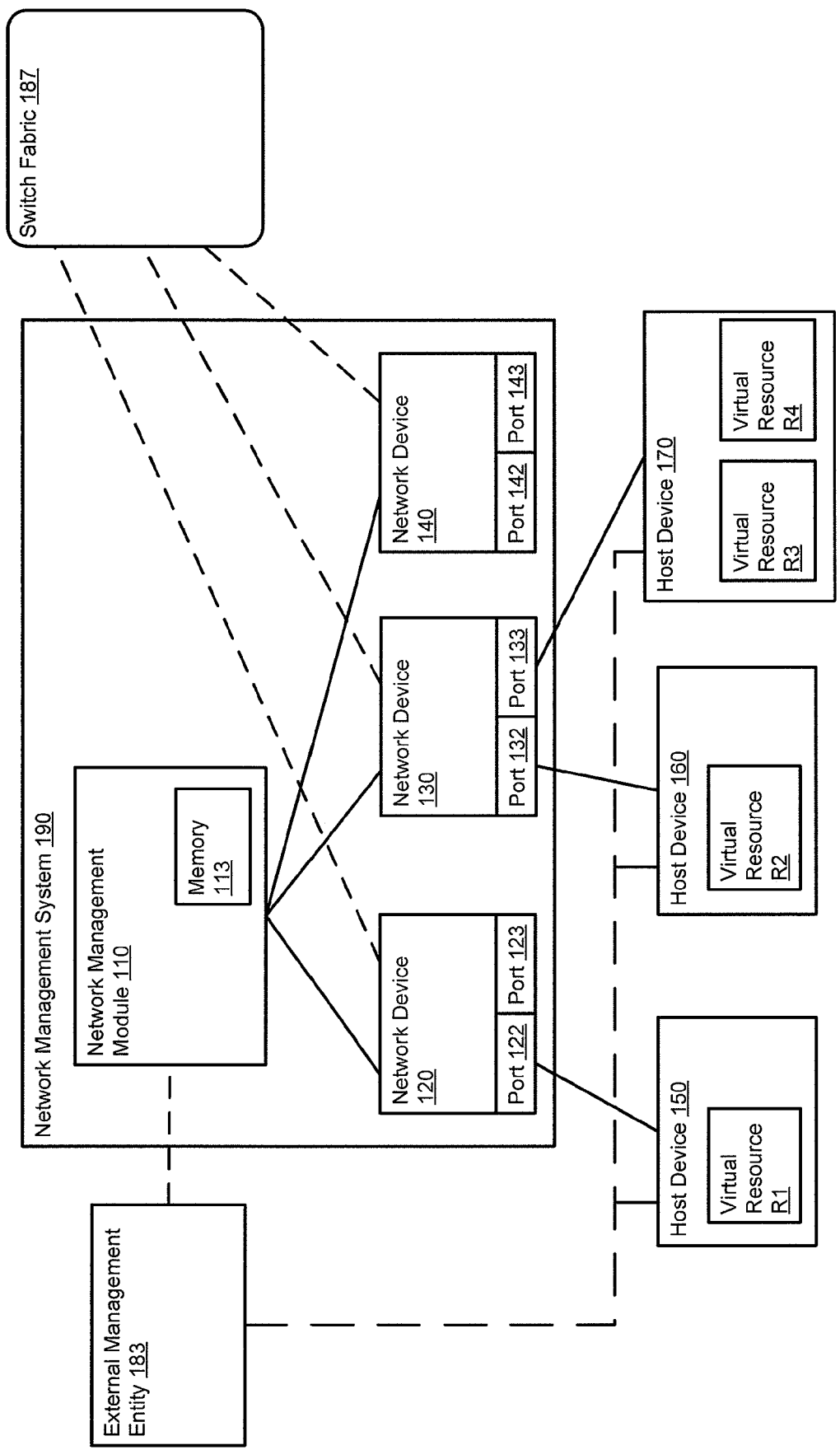
FIG. 1 is a system block diagram of a portion of a data center network including a network management system, according to an embodiment.

A centralized network management entity or network management module can cooperate with network devices to collect and manage network topology information. For example, network devices can push information about resources (both virtual and physical) currently operatively coupled to the network devices to the network management module as resources are attached to or separated from the network devices. An external management entity such as a server management tool and/or a network management tool can communicate with the network management module to send network provisioning instructions to network devices and other resources in the network without a static description of the network. Such a system avoids the difficulties of static network descriptions and the network performance degradations resulting from other types of server and network management systems.

In one embodiment, a server management tool or external management entity communicates with a network management module to provision network devices for virtual resources, and determine the operating state or status (e.g., running, suspended, or migrating) and the locations in a network of virtual resources. Virtual resources can be virtual machines executing on servers coupled to a switch fabric via access switches in a data center. Many servers can be coupled to the switch fabric via the access switches. For example, 2,048 servers, 4,096 servers, 9,192 servers, or more servers can be coupled to a single switch fabric (or, multiple interconnected switch fabrics or switch fabric portions configured to function as a single switch fabric). Due to the large number of servers in the data center network, the capability of each server to host multiple virtual resources, and virtual resource migration, a static description of the network is difficult for a network administrator to compile and update. Furthermore, a static network description can be problematic because a technician assembling or maintaining the system can inadvertently couple or connect a server to a port of an access switch other than the port specified in the network description for the data center. Additionally, an operator or administrator of the network can inadvertently start or instantiate a virtual resource on an incorrect server resulting in improper provisioning for that virtual resource.

Rather than rely on a static network description for discovery and/or management of network topology information (including binding of virtual resources to network devices), the network management module communicates and cooperates with the access switches and external management entity to discover or determine network topology information. After instantiating (or starting) a virtual machine on a host device, the external management entity can provide a device identifier of the virtual machine to the network management module. The device identifier can be, for example, a medium access protocol ("MAC") address of a network interface of the virtual machine or server, a name of the virtual machine or server, a globally unique identifier ("GUID"), and/or a universally unique identifier ("UUID") of the virtual resource or server. The GUID need not be globally unique with respect to all networks, virtual resources, servers, and/or network devices, but is unique within the network or network segment managed by the network management module. Additionally, the external management entity can provide instructions for provisioning a port of an access switch to which the server hosting the virtual machine connected. The access switch can detect that the virtual machine has been instantiated, started, and/or moved to the server. After detecting the virtual machine, the access switch can query the server for information about the server and/or virtual machine including, for example, a device identifier of the server or virtual machine.

The access switch can query or request information such as, for example, the device identifier of the virtual machine using, for example, the link layer discovery protocol ("LLDP"), some other standards-based or well-known protocol, or a proprietary protocol where the virtual machine is configured to communicate via that protocol. Alternatively, the virtual machine can broadcast information about itself (including the device identifier of the virtual machine) after detecting that it has been connected to an access switch using, for example, an Ethernet or IP broadcast packet and/or packets.

The access switch then pushes the device identifier of the virtual device (sometimes referred to as a virtual device identifier) and, in some embodiments, other information received from the virtual machine to the network management module. Additionally, the access switch can push a device identifier of the access switch and a port identifier of the port of the access switch to which the server hosting the virtual machine is connected to the network management module. This information functions as a description of the location of the virtual machine in the network, and defines the binding of the virtual machine to a server for the network management module and an external management entity. In other words, after receiving this information, the network management module can associate the device identifier of the virtual machine with a particular port on a particular access switch to which the virtual machine (or the server on which the virtual machine is hosted) is connected.

The device identifier of the virtual machine, the device identifier of the access switch, the port identifier, and the provisioning instructions provided by the external management entity can be stored in a memory accessible to the network management module. For example, the device identifier of the virtual machine, the device identifier of the access switch, and the port identifier can be stored in a memory configured as a database such that a database query based on the device identifier of the virtual machine returns the device identifier of the access switch, the port identifier, and the provisioning instructions.

Because the network management module can associate a location in the network of a virtual machine based on a device identifier of that virtual machine, the external management entity need not be aware of the topology of the network or the binding of virtual machines to servers to provision network resources (e.g., network devices, virtual machines, virtual switches or physical servers). Said differently, the external management entity can be agnostic as to the interconnections in the network and the location of the virtual machines in the network (e.g., on which server at which port of which access switch in the network), and can provision access switches in the network based on device identifiers of the virtual machines hosted by the servers in the network. In some embodiments, an external management entity can also provision physical servers. Additionally, because the network management module determines and manages the network topology information dynamically, the external management entity does not rely on a static description of the network for provisioning network.

As used in this specification, provisioning can include various types or forms of device and/or software module setup, configuration, and/or adjustment. For example, provisioning can include configuring a network device such as a network switch based on a network policy. More specifically, for example, network provisioning can include: configuring a network device to operate as a layer 2 or layer 3 network switch; alter routing tables of a network device; update security policies and/or device addresses or identifiers of devices operatively coupled to a network device; selecting which network protocols a network device with implement; setting network segment identifiers such as virtual local area network ("VLAN") tags for a port of a network device; and/or applying access control lists ("ACLs") to a network device. The network switch can be provisioned or configured such that rules and/or access restrictions defined by the network policy are applied to data packets that pass through the network switch. In some embodiments, virtual devices can be provisioned. A virtual device can be, for example, a software module implementing a virtual switch, virtual router, or virtual gateway that is configured to operate as an intermediary between a physical network and is hosted by a host device such as a server. In some embodiments, provisioning can include establishing a virtual port or connection between a virtual resource and a virtual device.

As used in this specification, the singular forms "a," "an" and "the" include plural referents unless the context clearly dictates otherwise. Thus, for example, the term "a host device" is intended to mean a single host device or a combination of host devices, "network device" is intended to mean one or more network devices, or a combination thereof.

FIG. 1 is a system block diagram of a portion of a data center network including a network management system, according to an embodiment. As illustrated in FIG. 1, network management system 190 includes network management module 110, network device 120, network device 130, and network device 140. In some embodiments, however, a network management system can include fewer or more network devices. In some embodiments, for example, a network management system can include 1024, 2048, 4096, or more network devices. Network management module 110 is operatively coupled to external management entity 183, network device 120, network device 130, and network device 140. Network device 120, network device 130, and network device 140 are operatively coupled to a data plane within switch fabric 187.

As illustrated in FIG. 1, network management module 110 is operatively coupled to network device 120, network device 130, and network device 140. Network management module 110 can be operatively coupled to network device 120, network device 130, and network device 140 using a variety of connections. In some embodiments, network management module 110 is operatively coupled to network device 120, network device 130, and network device 140 via a common network such as an Ethernet or fiber channel network. In some embodiments, network device 120, network device 130, and network device 140 can be directly connected to network management module 110 or a network resource such as a server hosting or executing network management module 110 as a software application or service. In other embodiments, network management module 110 can be operatively coupled to network device 120, network device 130, and network device 140 via a control plane of a switch fabric or a network appliance such as a switch fabric control system.

In some embodiments, network device 120, network device 130, and network device 140 are coupled to network management module 110 via a command interface port (not shown). In some embodiments, network device 120, network device 130, and network device 140 are coupled to network management module 110 via a network interface port or communication interface port (shown in FIG. 2). In some embodiments, network device 120, network device 130, and network device 140 are coupled to network management module 110 via a network interface port and a network (not shown).

Network device 120, network device 130, and network device 140 can be configured to communicate with network management module 110 via one or more protocols or methods. For example, network device 120, network device 130, and network device 140 can communicate with network management module 110 using a packet-based protocol by sending and receiving packets between network device 120, network device 130, network device 140, and network management module 110 via a network. In some embodiments, network device 120, network device 130, and network device 140 can each communicate with network management module 110 directly based on a dedicated connection between network management module and each of network device 120, network device 130, and network device 140.

In some embodiments, network device 120, network device 130, and network device 140 can communicate with network management module 110 based on a synchronous protocol. In some embodiments, network device 120, network device 130, and network device 140 can communicate with network management module 110 based on an asynchronous protocol. In some embodiments, network device 120, network device 130, and network device 140 can communicate with network management module 110 based on a combination of methods such as, for example, dedicated control lines (e.g., interrupts, data, and/or device selection) to each of network device 120, network device 130, and network device 140, and/or a packet protocol for transmission of data.

Figure 2:
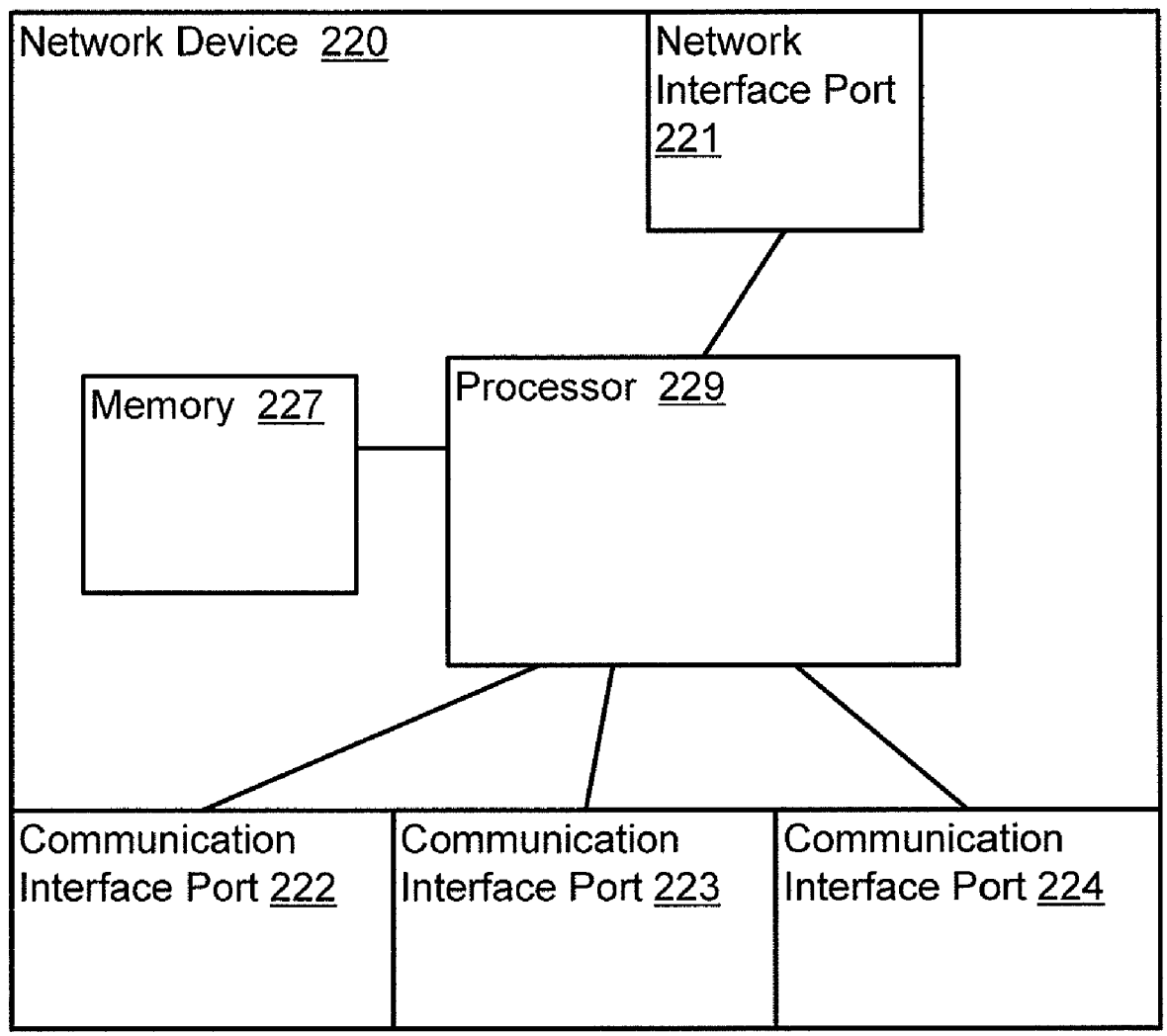
FIG. 2 is system block diagram of a network device, according to an embodiment.

FIG. 2 is system block diagram of a network device, according to an embodiment. Network device 220 includes processor 229 operatively coupled to memory 227, network interface port 221, communication interface port 222, communication port 223, and communication port 224. Processor 229 is configured to communicate with computing devices such as host devices (e.g., servers in a network) and virtual resources hosted by host devices via communication interface port 222, communication interface port 223, and communication interface port 224. In some embodiments, network device 220 can include more or fewer communication interface ports than are illustrated in FIG. 2. Network device can, for example, include 64, 128, 256, or more communication interface ports.

Network device 220 is configured to receive data packets and forward the data packets to one or more of network interface port 221, communication interface port 222, communication interface port 223, and/or communication interface port 224 based on parameters of the data packets. For example, a data packet received via network interface port 221 can include a destination parameter having a value associated with an identifier of a computing device connected to communication interface port 223. Processor 229 can determine to which communication interface port, if any, the packet should be forwarded based on, for example, data stored in memory 227. Because the data packet includes a destination parameter having a value associated with an identifier of a computing device connected to communication interface port 223, processor can determine that the data packet should be forwarded to communication interface port 223. In some embodiments, memory 227 can include rules and/or ACLs (provided as provisioning instructions from an external management entity via a network management module) that are satisfied by parameters of the data packet before processor 229 forwards the data packet. For example, a rule can specify that a source address parameter of the data packet include a value in a range of values specified in the rule. If the value is outside of the specified range of values, the data packet will not be forwarded to communication interface 223.

In some embodiments, network device 220 can be configured as a network switch such as an access switch coupled to a switch fabric. For example, network device 220 can be an access switch configured to communicate with host devices and/or other devices (e.g., storage servers, database servers, and/or other computer servers) via a protocol such as Ethernet through communication port 222, communication port 223, and communication port 224, and with a core of a switch fabric via another protocol (e.g., a cell-based protocol or other protocol other than Ethernet) through network interface port 221. In other words, network device 220 can provide host devices and/or other devices configured to communicate via one protocol with access to a switch fabric configured to communication via another protocol.

More specifically, for example, the core of a switch fabric can be configured as a strictly non-blocking network or rearrangeably non-blocking network such as a Clos network, and can include a data plane and a control plane. Thus, two host devices can be operatively coupled one to another via two network devices (each similar to network device 220) operatively coupled to a switch fabric. For example, a first host device can send a data packet addressed to a second host device via an Ethernet protocol to a first network device operatively coupled to a switch fabric. The first network device can receive the data packet and send the data packet via the switch fabric using a proprietary protocol to a second network device operatively coupled to the second network device. For example, first network device can send the data packet to the second network device by separating or segmenting the data packet into cells that are transported via a cell-based switch fabric based on data signals in a data plane and a control plane of the switch fabric. Alternatively, in some embodiments the switch fabric can segment the data packet prior to transporting it to the second network device. The second network device can then receive the cells representing the segmented data packet, reassemble the data packet, and send the data packet to the second host device via an Ethernet protocol. Alternatively, the switch fabric can reassemble the data packet based on the cells representing the data packet prior to providing the data packet to the second network device.

Said differently, in some embodiments, network device 220 can be configured to function as a gateway device between a switch fabric and a host device, virtual resources hosted by the host device, and/or other devices, which can be configured to transfer data based on different protocols. As described above, the host device (an the virtual resources hosted by the host device) can be configured to communicate based on an Ethernet protocol and the switch fabric can be a cell-based fabric where one or more portions of data (e.g., data packets) are transmitted via the switch fabric in one or more cells (e.g., variable size cells, fixed size cells). In other words, network device 220 can provide the host device and/or other devices configured to communicate via one protocol with access to the switch fabric, which can be configured to communicate via another protocol. In some embodiments, network device 220 can be configured to function as a router, a network hub device, and/or a network bridge device. In some embodiments, a routing can be layer-2 switching and/or layer-3 routing. In other words, a router can be a device configured to classify and/or operate on packets at layer-2 or layer-3.

Additionally, in some embodiments, network device 220 can be configured to function as a gateway device for multiple host devices. Specifically, routing functionality between virtual resources at multiple host devices can be performed at a network device such as network device 220. This capability can facilitate scaling of host devices configured to access, for example, a switch fabric via a network device in a desirable fashion.

In some embodiments, network device 220 can include a control interface port (not shown). The control interface port can be used for communicating with, for example, a network management module. For example, a network management module can be incorporated into a control plane of a network appliance and network device 220 can be operatively coupled to the control plane of the network appliance via the control interface. In other embodiments, network device 220 can communicate with a network management module via 221 network interface port and/or one or more of communication interface port 222, communication interface port 223, and communication interface port 224.

Returning to FIG. 1, network device 120 includes port 122 and port 123, and is operatively coupled to host device 150 via port 122. Port 122 and port 123 can be, for example, communication interface ports as illustrated in FIG. 2. Network device 130 includes port 132 and port 133, is operatively coupled to host device 160 via port 132, and is operatively coupled to host device 170 via port 133. Ports 132 and 133 can be, for example, communication interface ports as illustrated in FIG. 2. Network device 140 includes port 142 and port 143. Port 142 and 143 can be, for example, communication interface ports as illustrated in FIG. 2.

Figure 3:
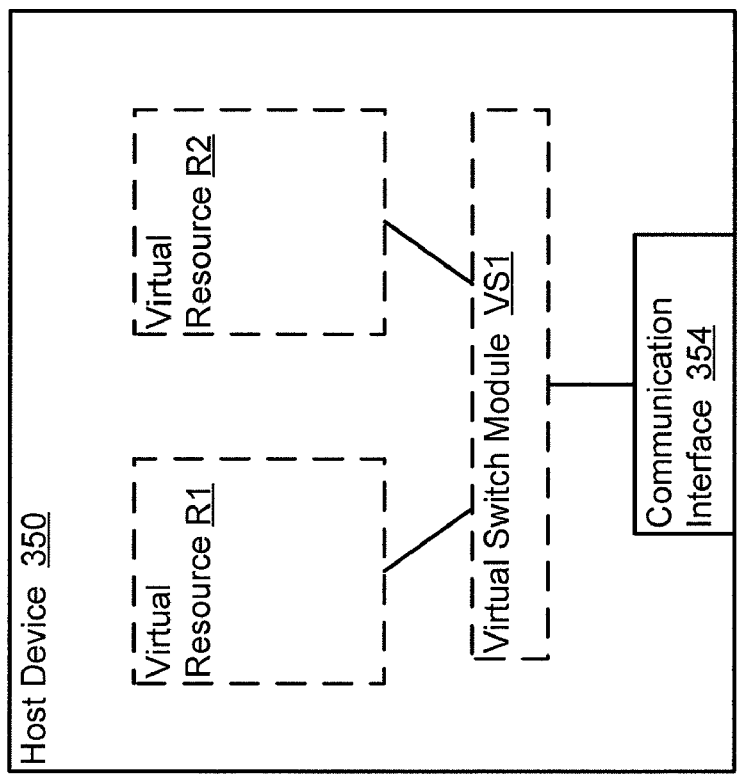
FIG. 3 is a logical system block diagram of a host device including a group of virtual resources, according to an embodiment.

FIG. 3 is a logical system block diagram of a host device including a group of virtual resources, according to an embodiment. Host device 350 can be any computing device capable of hosting, running, operating, and/or executing virtual resources. In some embodiments, a server can be a host device. In some embodiments, the host device is dedicated, configured, and/or optimized for a particular virtual resource or class of virtual resources. For example, a host device can be optimized to host virtual resources such as web servers in general, or a particular web server; file servers in general, or a particular file server or file serving protocol; or to perform network services in general, or a particular network service such as, for example, local directory access protocol ("LDAP"). In some embodiments, a virtual resource is a guest operating system. As illustrated in FIG. 3, host device 350 includes virtual resource R1 and virtual resource R2 operatively coupled to virtual switch module VS1. Virtual switch module VS1 is operatively coupled to communication interface 454.

Virtual resource R1 and virtual resource R2 can be, for example, software modules including network services such as web servers, dynamic host configuration protocol ("DHCP") servers, file transfer protocol ("FTP") servers, file servers, and/or other software modules. In some embodiments, virtual resource R1 and virtual resource R2 are virtual machines or virtual network appliances. Virtual machines and virtual network appliances can be software modules configured to emulate computing devices such as general purpose computers and/or specialized computing devices including network appliances.

Virtual resource R1 and virtual resource R2 are configured to communicate with a network via virtual switch module VS1. Virtual switch module VS1 is configured to operate as a bridge between, for example, a physical network to which host device 350 is operatively coupled via communication interface 354 and the virtual resources R1 and R2.

Virtual switch module VS1 can be a software module or a portion of a processor configured to communicate with virtual resource R1, virtual resource R2, and communication interface 354. Communication interface 354 can be a physical communication interface such as a network interface card ("NIC") or a portion of a software network stack associated with a NIC. In some embodiments, virtual switch module VS1 can be integrated with a software network stack associated with a NIC. In other words, virtual switch module VS1 can be a portion of a NIC network stack. More details related to cooperative provisioning and/or operation of virtual switch modules and network devices are set forth in co-pending U.S. patent application Ser. No. 12/346,608, filed on Dec. 30, 2008, and entitled "Methods and Apparatus Related to Data Transmissions between Virtual Resources via a Network Device;" co-pending U.S. patent application Ser. No. 12/346,612, filed on Dec. 30, 2008, and entitled "Methods and Apparatus Related to Data Transmissions between Virtual Resources via a Network Device;" co-pending U.S. patent application Ser. No. 12/346,615, filed on Dec. 30, 2008, and entitled "Methods and Apparatus For Routing between Virtual Resources based on a Routing Location Policy;" co-pending U.S. patent application Ser. No. 12/346,618, filed on Dec. 30, 2008, and entitled "Methods and Apparatus for Provisioning at a Network Device in Response to a Virtual Resource Migration Notification;" and co-pending U.S. application Ser. No. 12/346,625, filed on Dec. 30, 2008, and entitled "Methods and Apparatus Related to Managing Communications Between Virtual Resources;" all of which are incorporated herein by reference in their entireties. In some embodiments, a virtual switch module (or virtual switch) can be configured as a multiplexer and/or demultiplexer and switching (or routing) can take place or occur at a network device.

Figure 4:
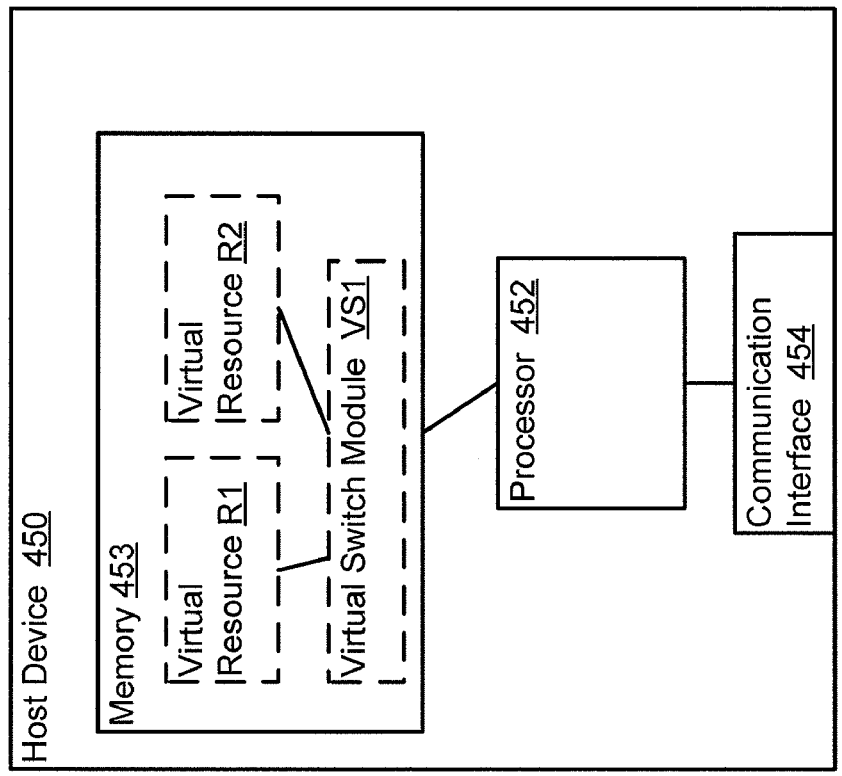
FIG. 4 is a system block diagram of a host device including a group of virtual resources, according to an embodiment.

FIG. 4 is a system block diagram of a host device including a group of virtual resources, according to an embodiment. As shown in FIG. 4, host device 450 includes a processor 452 operatively coupled to memory 453 and communication interface 454. In some embodiments, memory 453 is configured to store code that can be interpreted or decoded by processor 452 to cause processor 452 to execute virtual resource R1, virtual resource R2, and virtual switch module VS1. Said differently, in some embodiments, virtual resource R1, virtual resource R2, and virtual switch module VS1 are logical elements that can be represented by code and/or data in memory 453, and processor 452 executes the code and interprets the data to provide the functionality of or implement virtual resource R1, virtual resource R2, and/or virtual switch module VS1.

Communication interface 454 is configured to be operatively coupled to a network or other computing or network device. For example, host device 450 can be operatively coupled to another host device or a network device via communication interface 454. Processor 452 can communicate with the network or other computing or network device via communication interface 454. For example, processor 452 can receive a data packet via communication interface 454. Processor 452 can execute code representing virtual switch module VS1 to determine to if the data packet should be forwarded to one or both of virtual resource R1 and virtual resource R2. If processor 452 determines that the data packet should be forwarded to, for example, virtual resource R1, processor 452 can execute code associated with virtual switch VS1 and/or code associated with virtual resource R1 such that the data packet is forwarded or transferred to a portion of memory 453 representing a data packet input of virtual resource R1. Processor 452 can then execute code representing virtual resource R1 to process and/or respond to the data packet by, for example, providing a response to the source of the data packet via virtual switch module VS1 and communication interface 454.

Referring to FIG. 1, external management entity 183 can be, for example, a server management tool, a network management tool, and/or other software or hardware configured to manage and/or provision network devices 120, 130, and 140, and/or host devices 150, 160, and 170. In some embodiments, external management entity 183 can provide provisioning instructions to network devices 120, 130, and 140 via network management module 110, and to host devices 150, 160, and 170 without interacting with network management module 110. In other words, as illustrated in FIG. 1, external management entity 183 is logically coupled to host devices 150, 160, and 170. Thus, external management entity 183 can communicate with host devices 150, 160, and 170 independent of network management module 110. In some embodiments, external management entity 183 can be directly coupled to host devices 150, 160, and 170. In some embodiments, external management entity 183 and host devices 150, 160, and 170 communicate via a network. In some embodiments, external management entity 183 and host devices 150, 160, and 170 communicate via a network using out of band ("OOB") data packets.

External management entity 183 can be, for example, a server management tool, network management tool, or other tool or module configured to provide instructions such as provisioning instructions to network devices 120, 130, and 140 via network management module 110. For example, in some embodiments, external management entity 183 can be a computer executing a server management tool software application having a graphical user interface ("GUI") for managing servers within a network. A network administrator can, for example, select and/or manipulate icons and/or buttons to instantiate, migrate, suspend, and/or effect other state changes of a virtual resource. Thus, external management entity 183 can initiate, direct, and/or modify provisioning of network devices and/or other devices (e.g., virtual switches) in the network. In some embodiments, external management entity 183 can be a dedicated computing device executing a command line utility for provisioning network resources based on provisioning instructions provided to network management module 110.

External management entity 183 can control or manage virtual resources on host devices 150, 160, and 170, and communicate with network management module 110 to coordinate provisioning of network devices 120, 130, and 140. In some embodiments, external management entity 183 can instantiate a virtual resource R1 on host device 150 and assign a device identifier to virtual resource R1. After instantiating virtual resource R1 on host device 150, external management entity 183 can also provide the device identifier to network management module 110. In some embodiments, external management entity 183 can provide the device identifier to network management module 110 simultaneously (or substantially simultaneously) with instantiating virtual resource R1 on host device 150. In some embodiments, external management entity 183 can provide the device identifier to network management module 110 before instantiating virtual resource R1.

In addition to the device identifier of virtual resource R1, external management entity 183 can provide provisioning instructions to network management module 110. The provisioning instructions can be commands or code that network device 120 can interpret or execute to provision port 122, such that port 122 is configured with network attributes of virtual resource R1. For example, port 122 can be provisioned to perform routing for a VLAN with which virtual resource R1 is associated, to implement an ACL related to virtual resource R1, to enforce access limitations associated with virtual resource R1, and/or otherwise realize network attributes of virtual resource R1.

In some embodiments, an external management entity 183 can suspend a virtual resource and/or migrate a virtual resource. For example, an external management entity 183 can migrate virtual resource R1 from host device 150 to host device 160. Additionally, external management entity 183 can provide status information (e.g., device identifier, network attributes, and/or other information) about virtual resource R1 to network management system 110 after migrating or suspending virtual resource R1.

In addition to providing a device identifier and provisioning instructions to network management module 110 after instantiating, migrating, or suspending a virtual resource, external management entity 183 can update provisioning in the network. For example, a network administrator can use an external management entity 183 to change an ACL, security attributes, or a routing table of a virtual resource by providing a device identifier of the virtual resource and updated provisioning instructions to network management module 110. In some embodiments, network management module 110 can provide the updated provisioning instructions and device identifier to network devices 120, 130, and 140, and network devices 120, 130, and 140 can provision a port operatively coupled to a virtual resource having that device identifier. Thus, external management entity 183 can manage provisioning in the network without having access to location information of the virtual resource in the network. In other words, external management entity 183 can update provisioning in the network for a virtual resource (independent of the location in the network of the virtual resource) by providing the device identifier of the virtual resource and the updated provisioning instructions to network management module 110. In other embodiments, provisioning for the network device having that device identifier is not updated until one of network devices 120, 130, and 140 requests provisioning instructions from network management module 110.

In some embodiments, external management entity 183 is referred to as "external" because it is not integrated into network management system 190. For example, network management system 190 can be a portion of a switch fabric such as, for example, a processor module within a control plane of a switch fabric, and external management entity 183 can be a software application executing on a computer in communication with network management system 190 and/or the switch fabric, but external to network management system 190. In some embodiments, external management entity 183 is "external" because it is separate from a data plane and a control plane of a switch fabric, but is included in a management plane of the switch fabric.

Network management module 110 can communicate with external management entity 183 and network devices 120, 130, and 140 to provision ports of network devices 120, 130, and 140. In some embodiments, network management module 110 is configured to provide state or status updates of virtual resources to external management entity 183. In some embodiments, network management module 110 can be a processor or a processor module within a control plane of a network appliance, a switch fabric, or a switch fabric management system. For example, network management module 110 can be a processor module within a control plane of a switch fabric including switch fabric data plane and network device 120, network device 130, and network device 140 can be operatively coupled to a data plane of switch fabric 187 of the switch fabric. More details related to switch fabrics and control planes of switch fabrics are set forth in co-pending patent application U.S. patent application Ser. No. 12/345, 498, filed on Dec. 29, 2008, and entitled "Control Plane Architecture for Switch Fabrics," which is incorporated herein by reference in its entirety.

In some embodiments, network management module 110 can be a server or a network appliance separate from a switch fabric and operatively coupled to network device 120, network device 130, and network device 140. In some embodiments, network management module 110 can be a software application or service running or executing on a server or network appliance separate from a switch fabric and operatively coupled to network device 120, network device 130, and network device 140. Thus, in some embodiments, network device 120, network device 130, and network device 140 can be controlled (e.g., receive provisioning instructions and/or other control commands) separate from switch fabric 187, and can send and receive data via switch fabric 187 (or a data plane within a switch fabric 187). In some embodiments, network management module 110 can be a server or network appliance separate from a control plane of a network, and operatively coupled to network devices 120, 130, and 140 via a data plane of switch fabric 187. In some embodiments, network management module 110 can be operatively coupled to more than one switch fabric network, and can provision network devices operatively coupled to each of the switch fabric networks. In other words, a network management module 110 can manage more than one network.

Figure 5:
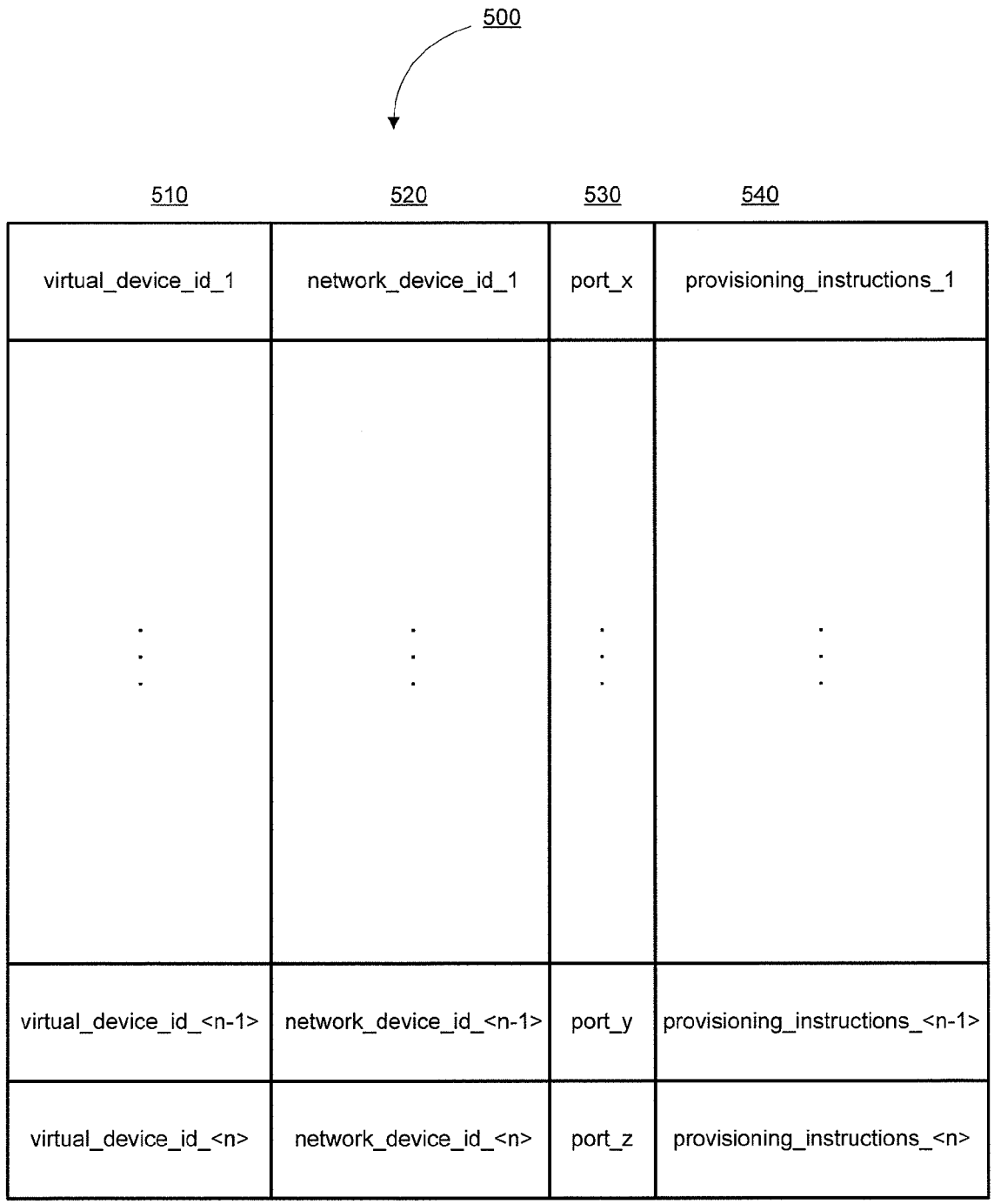
FIG. 5 is a block diagram of a table including device identifiers and port identifiers, according to an embodiment.

In some embodiments, network management module 110 includes memory 113. Memory 113 can be configured, for example, as a database, a table, or list to store device identifiers of virtual resources or host devices, network devices, and port identifiers of network device ports received from external management entity 183. For example, FIG. 5 is a block diagram of a table including device identifiers and port identifiers, according to an embodiment. Table 500 includes column 510 including identifiers of host devices, column 520 including device identifiers of network devices, column 530 including port identifiers of network device ports, and column 540 including provisioning instructions related to virtual machines operatively coupled to a network device. Each row of table 500 can be used to determine a network device and port to which a particular virtual resource is connected. For example, virtual_device_id_1 is a virtual device identifier associated with a virtual resource connected to port_x of a network device having network_device_id_1. In some embodiments, table 500 can also include a column (or other storage element) for provisioning instructions received from external management entity 183. In some embodiments, a memory (not shown) can be external to network management module 110. In other words, network management system 190 can include a memory accessible to network management module 110, but not included in network management module 110.

After network management module 110 receives a device identifier and provisioning instructions from external management entity 183, it can provision network devices 120, 130, and 140. In some embodiments, network management module 110 can provide the device identifier and provisioning instructions to network devices 120, 130, and 140. After a network device detects that a virtual resource having the device identifier is operatively coupled to a port of the network device, the network device can provision that port based on the provisioning instructions.

In some embodiments, network management module 110 does not provide the device identifier and provisioning instructions to each of network devices 120, 130, and 140. For example, to reduce the memory requirements of a network device, the network device can request provisioning instructions from network management module 110 after detecting a virtual resource operatively coupled to a port of the network device. Network management module 110 can provide the provisioning instruction to the network device in response to the request, and the network device can provision that port of the network device.

Network management module 110 can provide various interfaces such as command interfaces to enable external management entity 183 to communicate with network management module 110 and to enable external management entity 183 to provide device identifiers and provisioning instructions or commands to network management module 110. In some embodiments, network management module 110 can communicate via a proprietary protocol with external management entity 183. In some embodiments, communication between external management entity 183 and network module 110 is encrypted or secured using an encryption scheme such as, for example, symmetric encryption or public/private key encryption, and/or digital certificates. In some embodiments, network management module 110 can provide or support an application programming interface ("API") such that external management entity 183 can send provisioning instructions or commands to network management module 110 via a published API. In other embodiments, network management module 110 can provide interfaces to external management entity 183 based on other protocols.

Similarly, external management entity 183 can define or provide an API that network management module 110 can access to provide state or status (e.g., the operational state of a virtual resource) information about a virtual resource to external management entity 183. For example, network devices 120, 130, and 140 can provide the status information to network management module 110 based on network traffic, status updates provided by virtual resources or host devices, and/or other indicators of the status of virtual machines.

In some embodiments, an external management entity can define or use three parameters associated with a virtual resource: a device identifier, a mobility domain, and provisioning instructions (or parameters). The mobility domain can define host devices on which virtual resources in the mobility domain can be instantiated and/or onto which virtual resources in the mobility domain can be migrated. Additionally, the mobility domain can define network devices to which the host device in the mobility domain are operatively coupled. The external management entity can provide or push provisioning instructions for virtual resources in the mobility domain to network devices in the mobility domain, and not provide provisioning instructions to other network devices in a network. Thus, in some embodiments, only network devices that are part of a mobility domain receive provisioning information (instructions or parameters) for virtual resources in that mobility domain. More details related to mobility domains are set forth in co-pending U.S. patent application Ser. No. 12/346,630, filed on Dec. 30, 2008, and entitled "Methods and Apparatus for Distributed Dynamic Network Provisioning;" and U.S. patent application Ser. No. 12/346,632, filed on Dec. 30, 2008, and entitled "Methods and Apparatus for Distributed Dynamic Network Provisioning;" all of which are incorporated herein by reference in their entireties.

Figure 6:
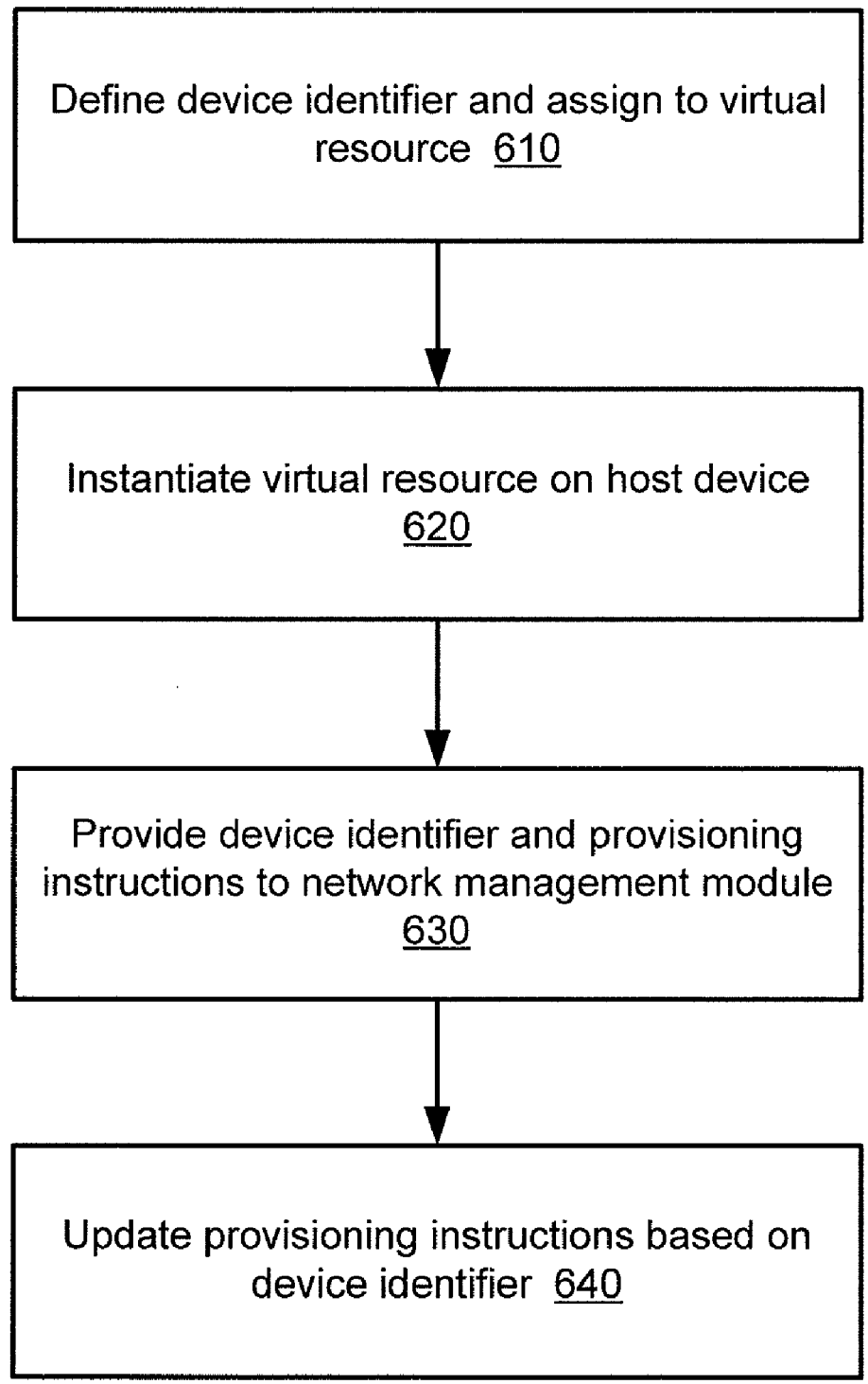
FIG. 6 is a flow chart of a process for managing a virtual resource in a network, according to an embodiment.

FIG. 6 is a flow chart of a process for managing a virtual resource in a network, according to an embodiment. In some embodiments, an external management entity can implement or execute process 600 to instantiate and manage virtual resources in a network. A device identifier is defined and assigned to a virtual resource, at 610. In some embodiments, the device identifier is a MAC address. In some embodiments, the device identifier is a device (or virtual resource) name or a reference number. In some embodiments, the device identifier is a GUID with respect to a network to which the virtual resource is operatively coupled. In some embodiments, the device identifier can be an IP address such as, for example, a static IP address of a virtual resource. The virtual resource is then instantiated or launched on a host device, at 620.

After the virtual resource has been instantiated on a host device, the device identifier and provisioning instructions associated with the virtual resource are provided to a network management module, at 630. For example, a network management module can provide an API to an external management entity that the external management entity can use to communicate with the network management module. In some embodiments, the order of steps 620 and 630 can be reversed to pre-provision a network device. In other words, in some embodiments, an external management entity can provide a device identifier and provisioning instructions to a network management module before instantiating a virtual resource associated with the device identifier and the provisioning instructions. In some embodiments, a network management module can provide the device identifier and provisioning instructions to a network device to pre-provision the network device such that the network device is provisioned before the virtual resource is started.

In some embodiments, provisioning instructions are updated based on a device identifier, at 640. For example, a network administrator can modify a routing policy of a virtual resource using an external management entity, and the external management entity can provide the updated routing policy (as a provisioning instruction) and the device identifier of that virtual resource to a network management module. The network management module can update the provisioning instructions stored at the network management module or at a network device based on the device identifier. For example, a network device can access provisioning instructions in a database based on the device identifier.

In some embodiments, process 600 can include more or fewer steps than illustrated in FIG. 6. For example, in some embodiments provisioning instructions are not updated after they are provided to a network management module. In some embodiments, process 600 can include requesting and/or receiving status information about the state of a virtual machine from a network management module.

Figure 7:
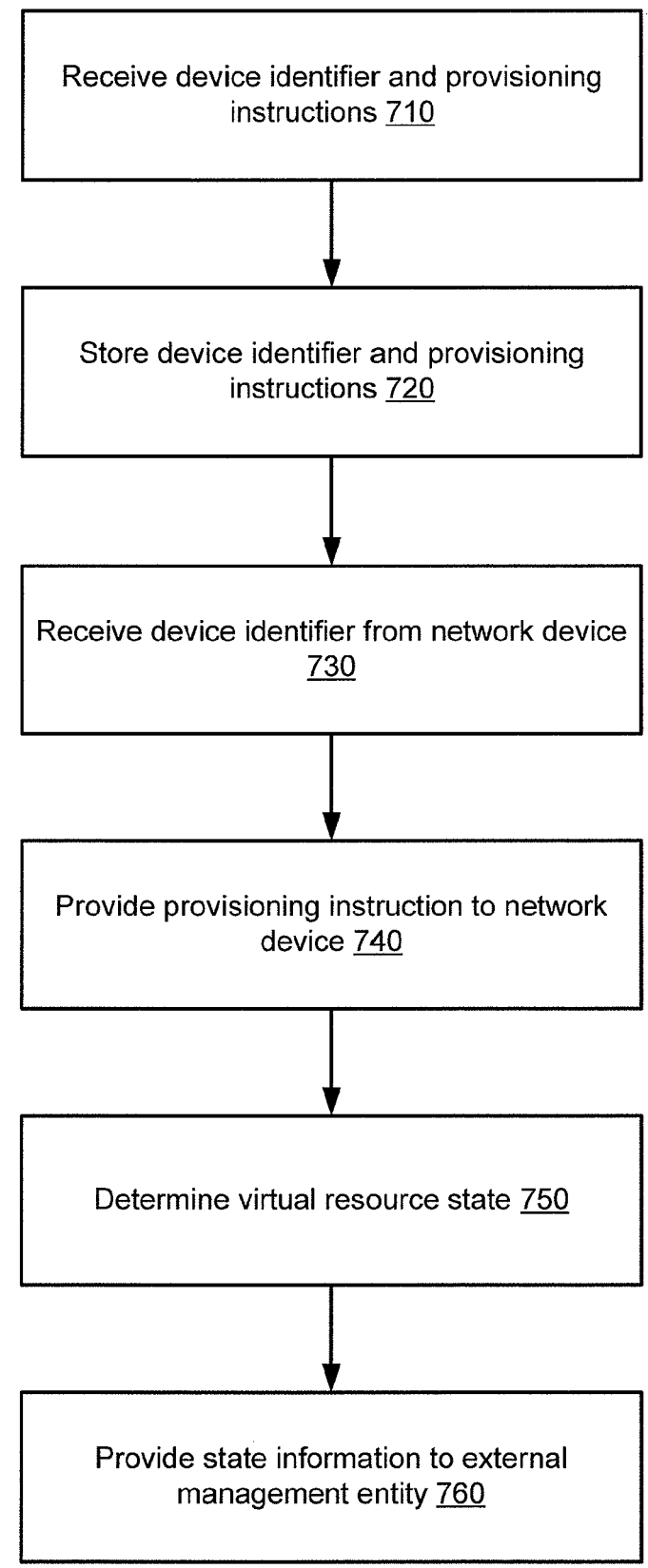
FIG. 7 is a flow chart of a process for providing provisioning information to a network device, according to an embodiment.

FIG. 7 is a flow chart of process 700 for providing provisioning information to a network device, according to an embodiment. In some embodiments, a network management module can execute or implement process 700. A device identifier and provisioning instructions are received, at 710. In some embodiments, the device identifier and provisioning instructions are received from an external management module after the external management entity has instantiated a virtual machine associated with the device identifier and the provisioning instructions. In some embodiments, the external management module can send the device identifier and the provisioning instructions before instantiating the virtual resource. The device identifier and provisioning instructions are stored, at 720. For example, the device identifier and provisioning instructions can be stored in a table in a memory accessible to a network management entity. In some embodiments, the memory is an on-chip memory (e.g., on-chip memory with a processor).

A device identifier is received from a network device, at 730. The device identifier is associated with a virtual resource or a physical server that the network device has detected at one of the ports of the network device. In some embodiments, a network management entity can interpret the device identifier as a request for provisioning instructions, and can access the provisioning instructions associated with device identifier and provide the provisioning instructions (or provisioning instruction) to the network device. For example, the network management module can use the device identifier as a key to access the provisioning instructions in a database.

In some embodiments, a network management module can also receive location information about the network device in the network. For example, a device identifier of the network device and a port identifier of the port at which the virtual resource was detected can be sent to a network management module from a network device. In some embodiments, the network management module can store the device identifier of the network device and the port identifier with the device identifier of the virtual resource detected and its associated provisioning instructions. In some embodiments, information about the location in a network of a virtual resource can be referred to as a network location descriptor. For example, a network location descriptor can include a device identifier of a network device and a port identifier. In some embodiments, a network location descriptor defines a binding of a virtual resource to a port in a network.

In some embodiments, a state of a virtual resource is determined, at 750. For example, a network device can provide a state status to a network management module based on network traffic statistics, a status update from a virtual resource, and/or other status indicators. In some embodiments, information about the state of the virtual resource is provided to an external management entity, at 760. External management entity can use this information to, for example, determine modifications or updates to provisioning instructions associated with the virtual resource. In some embodiments, a network management module also provides a location descriptor of the virtual resource.

In some embodiments, process 700 can have more or fewer steps than illustrated in FIG. 7. For example, in some embodiments a network management module does not provide information about the status of virtual machines to an external management entity.

Figure 8:
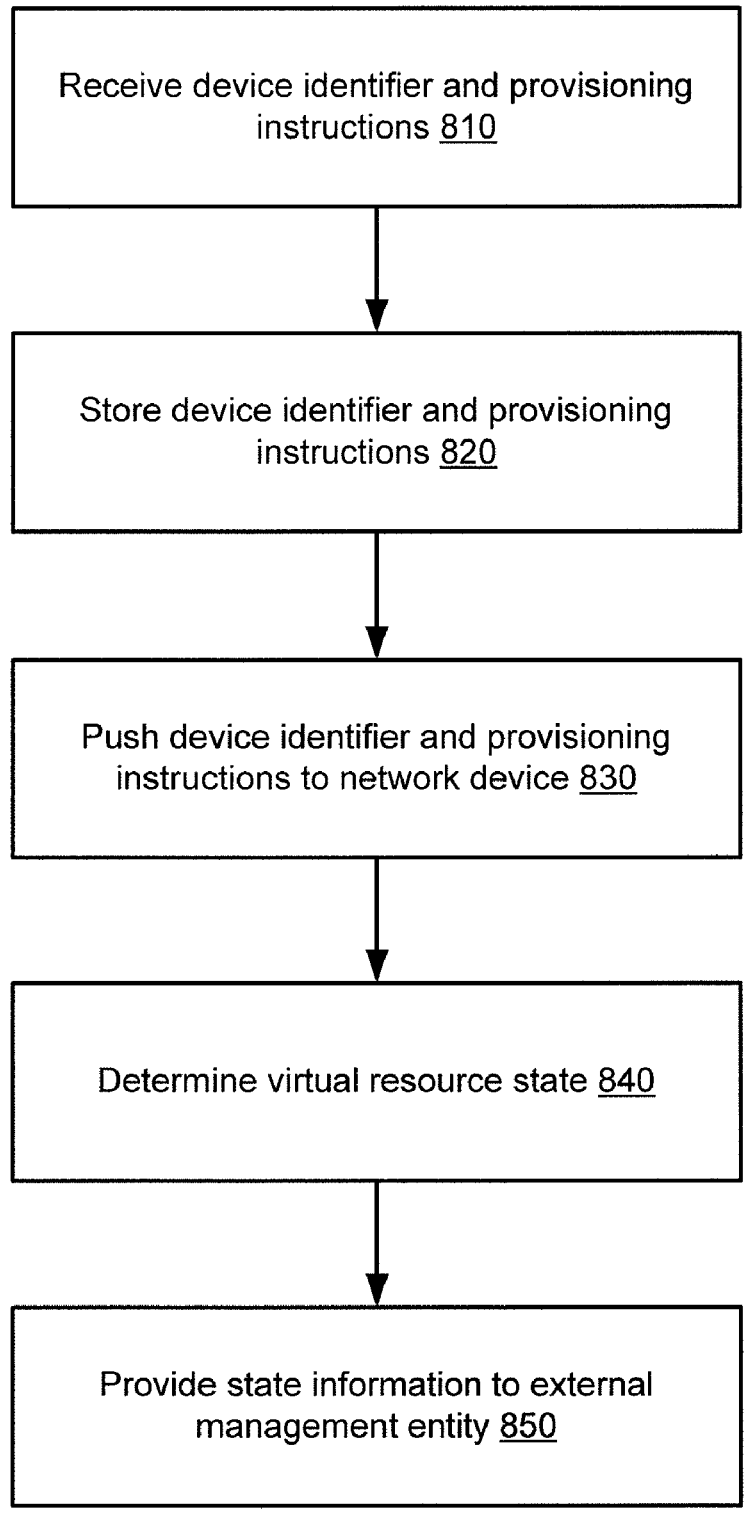
FIG. 8 is a flow chart of another process for providing provisioning information to a network device, according to another embodiment.

FIG. 8 is a flow chart of another process for providing provisioning information to a network device, according to another embodiment. In some embodiments, a network management module can execute or implement process 800. A device identifier and provisioning instructions are received, at 810. In some embodiments, the device identifier and provisioning instructions are received from an external management entity after the external management entity has instantiated a virtual machine associated with the device identifier and the provisioning instructions. In some embodiments, the external management entity can send the device identifier and the provisioning instructions before instantiating the virtual resource. The device identifier and provisioning instructions are stored, at 820. For example, the device identifier and provisioning instructions can be stored in a table in a memory accessible to a network management entity. In some embodiments, the memory is an on-chip memory on a single semiconductor chip with a processor.

The device identifier and provisioning instructions are pushed to the network device, at 830. In other words, the network management module initiates the transfer of the device identifier. In some embodiments, a network device can request, for example, at periodic intervals, device identifiers of virtual resources from a network management module. Thus, a network management module can provide the device identifier and provisioning instructions to a network device before the virtual resource associated with the device identifier and provisioning instructions is instantiated. This can be useful to prevent network traffic loss to a virtual resource during, for example, a migration of the virtual resource from one host device to another.

In some embodiments, a state of a virtual resource is determined, at 850. For example, a network device can provide a state or status of a virtual resource to a network management module based on network traffic statistics, a status update from a virtual resource, and/or other status indicators. In some embodiments, information about the state of the virtual resource is provided to an external management entity, at 860. External management entity can use this information to, for example, determine modifications or updates to provisioning instructions associated with the virtual resource. In some embodiments, a network management module also provides a location descriptor of the virtual resource.

In some embodiments, process 800 can have more or fewer steps than illustrated in FIG. 8. For example, in some embodiments a network management module does not provide information about the status of virtual machines to an external management entity. Additionally, similar to process 700, process 800 can include determining a network location descriptor of the virtual resource, and providing the network location descriptor to an external management entity.

Figure 9:
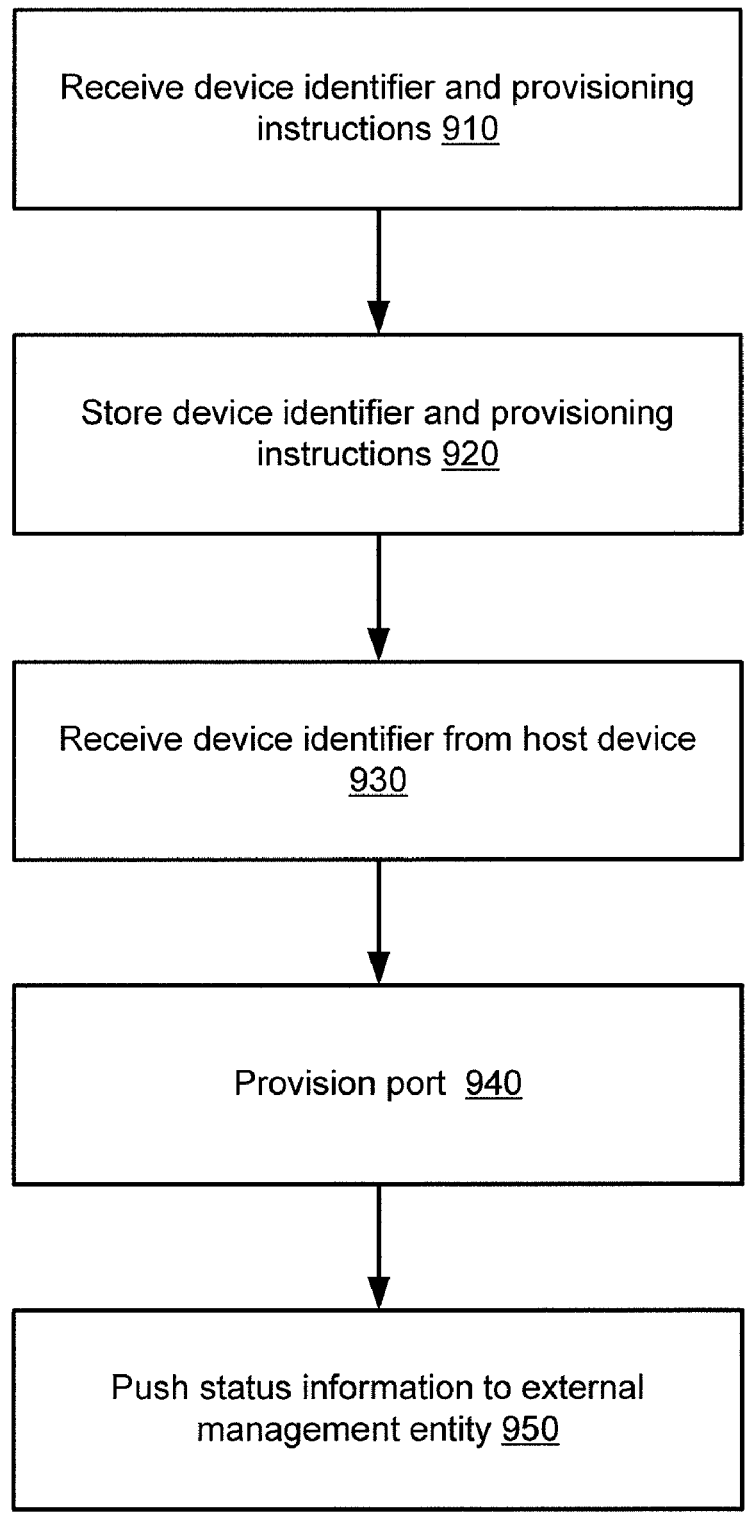
FIG. 9 is a flow chart of a process for provisioning a port of a network device, according to an embodiment.

FIG. 9 is a flow chart of a process for provisioning a port of a network device, according to an embodiment. In some embodiments, a network device can execute or implement process 900. A device identifier and provisioning instructions are received, at 910. At 920, the device identifier and provisioning instruction are stored. In some embodiments, a network management module can provide a device identifier and provisioning instructions to a network device so that the network device can provision a port (based on the provisioning instructions) for a virtual device (or physical server) when the network device detects at the port a virtual device having that device identifier. In some embodiments, a network device stores the device identifier and provisioning instructions at a memory location in a memory. In some embodiments, the device identifier and provisioning instructions are stored in a database, and are accessible based on the device identifier.

A device identifier is received from a host device, at 930. In some embodiments, the device identifier is associated with a host device such as a server. In some embodiments, the device identifier is received from a virtual resource hosted on the host device. In other words, a host device or virtual resource is detected by the network device, at 930. In some embodiments, a virtual resource can broadcast or send a device identifier to a network device such as an access switch, for example, after the virtual resource is instantiated, started, or moved to a host device operatively coupled to the access switch. In some embodiments, a host device such as a server can broadcast or send to a network device a device identifier of the virtual resources hosted by the host device after detecting or determining that the host device is operatively coupled to the network device. In some embodiments, a network device can request a device identifier from a virtual resource after the network device detects or determines that the virtual resource is operatively coupled or connected to the network device. For example, an access switch can detect that a virtual resource has been instantiated on a host device connected to a port of the access switch and then request information about the virtual resource via LLDP. In some embodiments, a host device sends additional information such as information related to, for example, computational or network load on the host device capabilities of the host device and/or one or more virtual resources hosted by the host device, or other information related to the host device or virtual resource.

The network device can access, for example, a memory or database including device identifiers and provisioning instructions to access provisioning instructions for the host device or virtual resource detected, at 930. After the provisioning instructions have been accessed, the port of the network device at which the host device or virtual resource was detected is provisioned, at 940. In other words, the port is configured based on the provisioning instructions associated with the device identifier of the host device or virtual resource.

In some embodiments, a port is provisioned by applying an ACL to the port and/or configuring the port to operate on a VLAN specified by a VLAN tag of a provisioning instruction. In other embodiments, provisioning includes configuring a port to operate as a layer-2 switch or a layer-3 switch. In other embodiments, provisioning can include other configuration and/or setup. In some embodiments, a class of service parameter is included in a provisioning instruction and a port is provisioned with a class of service. In some embodiments, a port of a network device is provisioned to operate as a layer-2 or layer-3 switch (or router) for a particular virtual resource operatively coupled to that port. In some embodiments, a port configured (or provisioned) for a particular virtual resource can be referred to as a virtual port. In some embodiments, a port of a network device can be configured as multiple virtual ports. For example, a port can be configured to operate as a layer-2 switch (or router) for one virtual resource operatively coupled to that port, and configured to operate as a layer-3 switch (or router) for another virtual resource operatively coupled to that port.

At 950, status information about the virtual resource or host device is pushed to a network management module. In some embodiments, the network management module pushes the status information to an external management entity. In some embodiments, status information includes a device identifier of the network device that detected the virtual resource or host device. In some embodiments, status information includes a port identifier of the port (on the device identifier that detected the virtual resource or host device) to which the virtual resource or host device is operatively coupled. In other embodiments, status information can be related to a status or operational state of the virtual resource or host device. In some embodiments, process 900 includes more or fewer steps than illustrated in FIG. 9.

Figure 10:
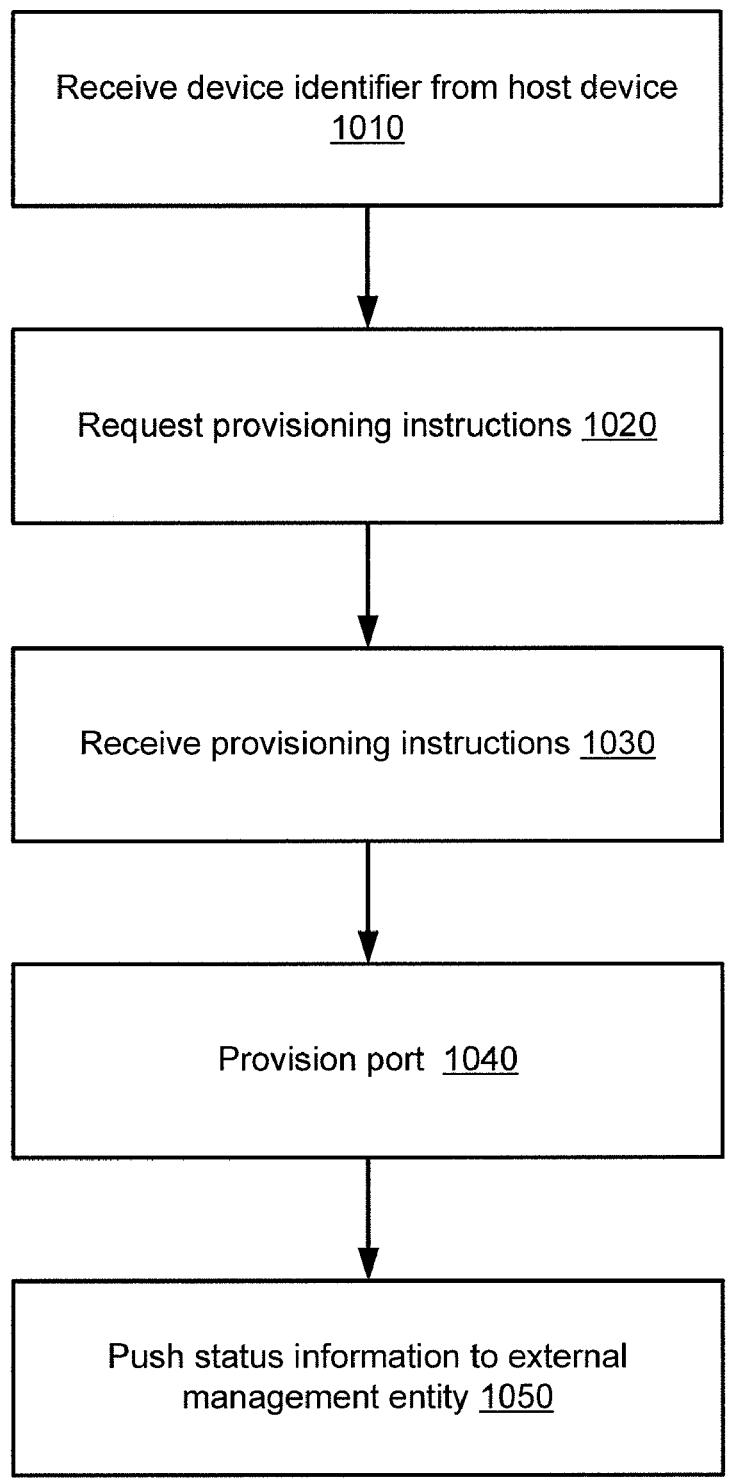
FIG. 10 is a flow chart of another process for provisioning a port of a network device, according to an embodiment.

FIG. 10 is a flow chart of another process for provisioning a port of a network device, according to another embodiment. In some embodiments, a network device can execute or implement process 1000. A device identifier is received from a host device, at 1010. In some embodiments, the device identifier is associated with a host device such as a server. In some embodiments, the device identifier is received from a virtual resource hosted on the host device. In other words, a host device or virtual resource is detected by the network device, at 1010. In some embodiments, a virtual resource can broadcast or send a device identifier to a network device such as an access switch, for example, after the virtual resource is instantiated, started, or moved to a host device operatively coupled to the access switch. In some embodiments, a host device such as a server can broadcast or send to a network device a device identifier of the virtual resources hosted by the host device after detecting or determining that the host device is operatively coupled to the network device. In some embodiments, a network device can request a device identifier from a virtual resource after the network device detects or determines that the virtual resource is operatively coupled or connected to the network device. For example, an access switch can detect that a virtual resource has been instantiated on a host device connected to a port of the access switch and then request information about the virtual resource via LLDP.

In some embodiments, provisioning instructions are requested from, for example, a network management module, at 1020, in response to receiving the device identifier, at 1010. In some embodiments, a network device can request provisioning instructions from a network management module based on the device identifier. For example, the network management module can store the provisioning instructions such that they are accessible based on the device identifier. The network device can provide the device identifier to the network management module, the network management module can access the provisioning instructions (e.g., in a database or table in a memory) based on the device identifier. The network management module can send the provisioning instructions to the network device, and the provisioning instructions can be received by the network device, at 1030.

After the provisioning instructions are received, at 1030, the port at which the virtual resource or host device was detected is provisioned according to the provisioning instructions, at 1040. In other words, the port is configured based on the provisioning instructions associated with the device identifier of the host device or virtual resource.

In some embodiments, a port is provisioned by applying routing policy to the port, and/or configuring the port to classify data packets based on conditions included in a provisioning instruction. In other embodiments, provisioning includes applying bandwidth limits, permissions requirements, restrictions on a destination transmission control protocol port field of incoming data packets, and other rules to the port. In other embodiments, provisioning can include other configuration and/or setup.

At 1050, status information about the virtual resource or host device is pushed to a network management module. In some embodiments, the network management module pushes the status information to an external management entity. In some embodiments, status information includes a device identifier of the network device that detected the virtual resource or host device. In some embodiments, status information includes a port identifier of the port (on the device identifier that detected the virtual resource or host device) to which the virtual resource or host device is operatively coupled. In other embodiments, status information can be related to a status or operational state of the virtual resource or host device.

In some embodiments, process 1000 includes more or fewer steps than illustrated in FIG. 10. For example, a network device can request from a host device the device identifiers of virtual resources hosted by the host device. In some embodiments, a network device can determine the state or status of a virtual device based on network traffic statistics, a status update from a virtual resource, and/or other status indicators. In some embodiments, the network device provides state or status information related to a state or status of a virtual resource to a network management module. In some embodiments, the network device includes the device identifier of the virtual resource to which the status information relates. In some embodiments, the network management module stores the status information based on the device identifier. In some embodiments, the network management module provides the status information together with the associated device identifier to an external management entity.

Figure 11:
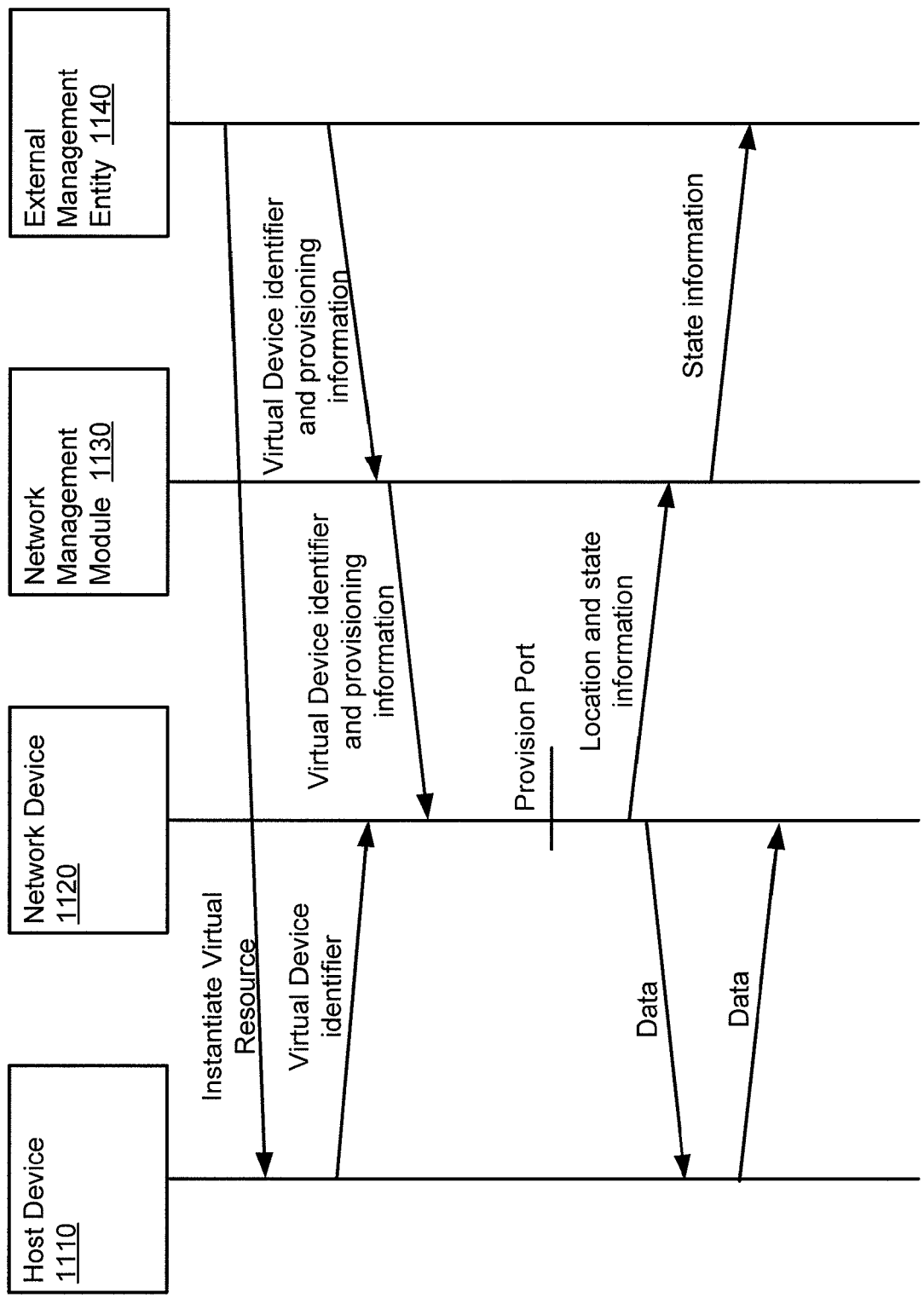
FIG. 11 illustrates a communication flow for determining network topology during network provisioning, according to an embodiment.

FIG. 11 illustrates a communication flow for determining network topology during network provisioning, according to an embodiment. As illustrated in FIG. 11, external management entity 1140 instantiates a virtual resource on host device 1110. In some embodiments, external management entity 1140 sends a signal to host device 1110, and host device 1110 starts a virtual machine on host device 1110 in response to the signal. As discussed above, external management entity 1140 assigns a device identifier to the virtual resource, and that device identifier is used to provision a port in a network for the virtual resource as the virtual resource migrates in the network. After external management entity 1140 instantiates the virtual resource (or causes the virtual resource to be instantiated), external management entity 1140 provides the device identifier and provisioning instructions for ports operatively coupled to the virtual resource to network management module 1130. Network management module 1130 forwards the device identifier and the provisioning instructions to network device 1120. In some embodiments, external management entity 1140 provides the device identifier and the provisioning instructions to network management module 1130 before instantiating the virtual resource.

After the virtual resource is instantiated, host device 1110 (or the virtual resource) provides the device identifier to network device 1120. Receipt of the device identifier notifies network device 1120 that the virtual resource is operatively coupled to a port of network device 1120. Additionally, the device identifier triggers provisioning of the port operatively coupled to the virtual resource. Network device 1120 provisions the port after receiving the device identifier and the provisioning instructions.

In some embodiments, as illustrated in FIG. 11, location and state information associated with the virtual resource are sent from network device 1120 to network management module 1130. In some embodiments, state information about the virtual resource is provided to external management entity 1140 from network management module 1130. In some embodiments, location information related to the virtual resource is provided from network management module 1130 to external management entity 1140. The device identifier typically is included in such communication to identify the virtual resource to which the information (or communication) relates. As illustrated in FIG. 11, data such as, for example, data to and from a web server executing as a virtual resource on host device 1110 can be exchanged between host device 1110 and a device (not shown) attached to the network via network device network device 1120 after the port has been provisioned. In some embodiments, the network can be a multi-stage switch fabric within, for example, a data center network.

Figure 12:
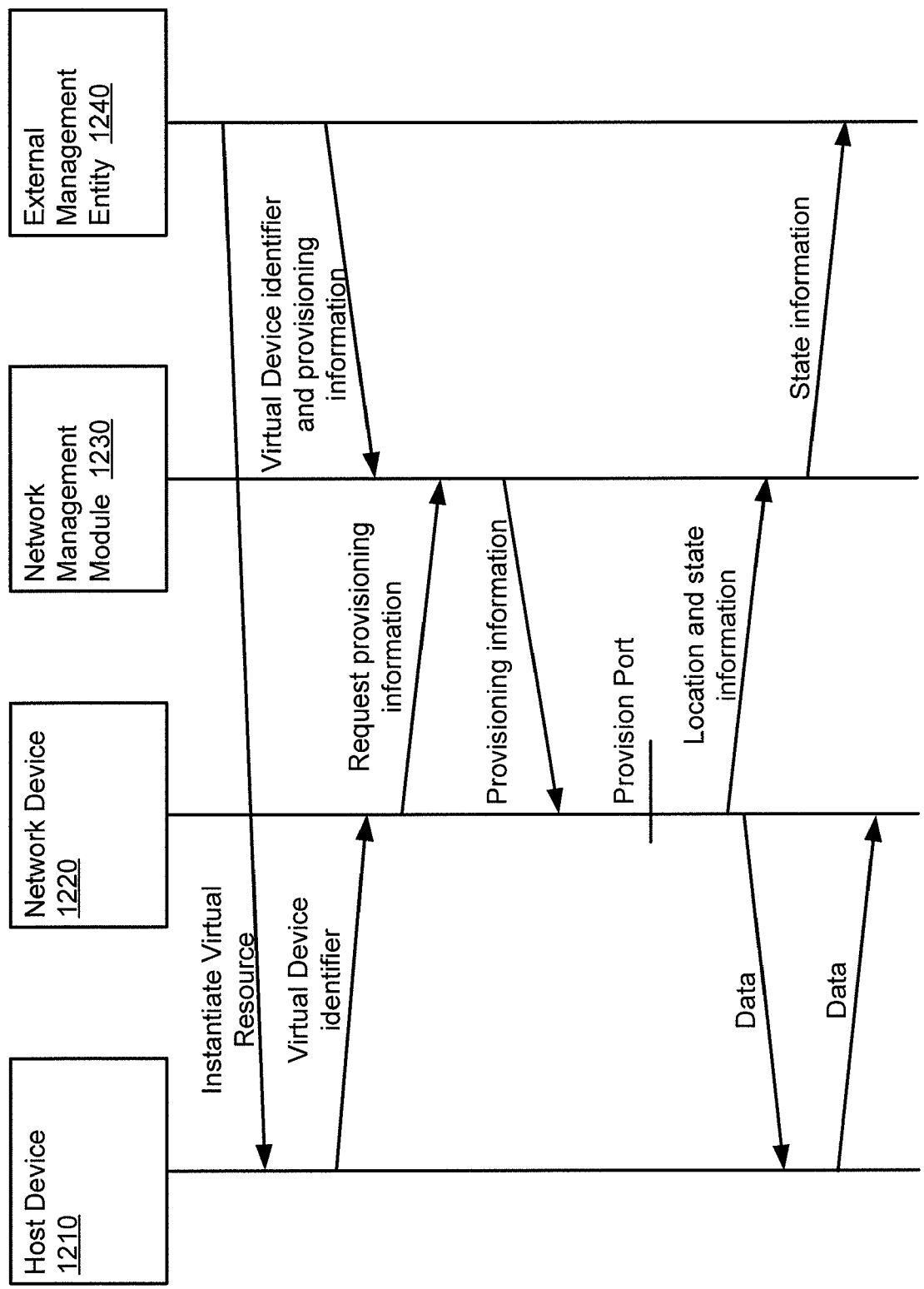
FIG. 12 illustrates another communication flow for determining network topology during network provisioning, according to another embodiment.

FIG. 12 illustrates another communication flow for determining network topology during network provisioning, according to another embodiment. As illustrated in FIG. 12, external management entity 1240 causes a virtual resource to be instantiated on host device 1210. As discussed above, external management entity 1240 assigns a device identifier to the virtual resource, and that device identifier is used to provision a port in a network for the virtual resource as the virtual resource migrates in the network. After external management entity 1240 instantiates the virtual resource, external management entity 1240 provides the device identifier and provisioning instructions for ports operatively coupled to the virtual resource to network management module 1230. In some embodiments, external management entity 1240 provides the device identifier and the provisioning instructions to network management module 1230 before instantiating the virtual resource.

After the virtual resource is instantiated, host device 1210 (or the virtual resource) provides the device identifier to network device 1220. Receipt of the device identifier notifies network device 1220 that the virtual resource is operatively coupled to a port of network device 1220. Additionally, receipt of the device identifier triggers a request for provisioning instructions (or information) from network device 1220 to network management module 1230.

Network device 1220 requests (including the device identifier) provisioning information from network management module 1230. Network management module 1230 selects provisioning instructions based on the device identifier, and provides the provisioning information to network device 1220. Network device 1220 provisions the port after receiving the device identifier and the provisioning information.

In some embodiments, as illustrated in FIG. 12, location and state information associated with the virtual resource are sent from network device 1220 to network management module 1230. In some embodiments, state information about the virtual resource is provided to external management entity 1240 from network management module 1230. In some embodiments, location information related to the virtual resource is provided from network management module 1230 to external management entity 1240. The device identifier typically is included in such communication to identify the virtual resource to which the information (or communication) relates. As illustrated in FIG. 12, data such as, for example, data to and from a web server executing as a virtual resource on host device 1210 can be exchanged between host device 1210 and a device (not shown) attached to the network via network device network device 1220 after the port has been provisioned. In some embodiments, the network can be a multi-stage switch fabric within, for example, a data center network.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language. A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; read-only memory ("ROM"); and random-access memory ("RAM") devices such as solid state or FLASH drives. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process for provisioning network device based on or in response to a virtual resource operatively coupled to the network device can be useful in other embodiments and/or processes such as provisioning a network device based on or in response to a host device operatively coupled to the network device. Additionally, embodiments described with reference to specific forms of communication such as communication between host device, network devices, network management modules, and external management entities via a network are also applicable to other forms of communication such as communication via a command plane. Some embodiments that have been described in relation to a software implementation can be implemented as digital or analog hardware. Some embodiments that have been described in relation to virtual resources can be applicable to host devices such as physical servers. For example, software modules can be implemented on semiconductor chips. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A system, comprising:
a network device having a physical port configured to be operatively coupled to a host device hosting a virtual resource; and
a network management module implemented as a hardware module or a software module stored in a memory, the network management module being operatively coupled to the network device, the network management module configured to provide a command interface to an external management entity,
the network device configured to push to the network management module a device identifier of the virtual resource and a device identifier of the network device,
the network management module configured to receive from the external management entity a provisioning instruction including the device identifier of the virtual resource and not including the device identifier of the network device,
the network management module configured to associate the provisioning instruction with the device identifier of the network device based on the device identifier of the virtual resource.

2. The system of claim 1, wherein the network management module is configured to send a portion of the provisioning instruction to the network device based on the device identifier of the network device.

3. The system of claim 1, wherein:
the device identifier of the virtual resource and the device identifier of the network device are pushed to the network management module in response to a migration of the virtual resource to the host device; and
the provisioning instruction is configured to provision the network device such that the network device forwards data packets associated with the virtual resource to the virtual resource after the migration of the virtual resource.

4. The system of claim 1, wherein:
the device identifier of the network device includes a network address of the network device; and
the device identifier of the network device includes a port identifier of the physical port of the network device operatively coupled to the host device.

5. The system of claim 1, wherein the network device is configured to receive the device identifier of the virtual resource from the host device via the physical port and prior to pushing the device identifier of the virtual resource to the network management module.

6. The system of claim 1, wherein the network device is configured to receive the device identifier of the virtual resource from the host device in response to the host device receiving the device identifier of the virtual resource from the external management entity via a data path independent of the network management module.

7. The system of claim 1, wherein the network device is configured to provision the physical port based on the provisioning instructions.

8. The system of claim 1, wherein the network device is an access switch configured to operatively couple the host device to a data plane of a switch fabric.

9. A method, comprising:
receiving, from a network device, a profile associated with a virtual resource hosted on a host device operatively coupled to a physical port of the network device, the profile including a network location descriptor associated with a location in a network of the virtual resource, the profile including a device identifier associated with the virtual resource;
receiving, from an external management entity, a provisioning instruction including the device identifier, the provisioning instruction being independent of a topology of the network;
associating the provisioning instruction with the network location descriptor based on the device identifier; and
sending, based on the associating, a portion of the provisioning instruction to the network device such that the network device can provision the physical port based on the portion of the provisioning instruction.

10. The method of claim 9, wherein:
the virtual resource is a virtual machine hosted by a server; and
the network device is an access switch.

11. The method of claim 9, further comprising storing the profile of the virtual resource such that the network location descriptor included in the profile is accessible based on the device identifier included in the profile.

12. The method of claim 9, wherein the associating includes selecting the profile from a plurality of profiles based on the device identifier included in the provisioning instruction.

13. The method of claim 9, wherein the network location descriptor includes a physical port identifier associated with the physical port of the network device, a device identifier associated with the network device, and a device identifier associated with the virtual resource.

14. The method of claim 9, further comprising sending a portion of the provisioning instruction to the host device hosting the virtual resource based on the provisioning instruction and the network location descriptor.

15. The method of claim 9, wherein the network device is a network access switch configurable to forward data packets to the virtual resource based on the provisioning instruction.

16. The method of claim 9, further comprising:
receiving a deprovisioning instruction including the device identifier; and
sending a portion of the deprovisioning instruction to the network device based on the deprovisioning instruction and a portion of the network location descriptor.

17. The method of claim 9, wherein the provisioning instruction is configured to provision the network device such that the network device forwards data packets associated with a virtual port identifier included in the provisioning instruction to the virtual resource, the virtual resource being associated with the virtual port identifier.

18. The method of claim 9, wherein the profile is pushed to the network device in response to an instantiation of the virtual resource at the host device operatively coupled to the physical port of the network device.

19. The method of claim 9, wherein the sending includes sending the portion of the provisioning instruction to the network device such that the network device can provision the physical port such that the host device is configured to send data to a switch fabric via the network device.

20. The method of claim 9, wherein the receiving the profile is in response to the network device receiving the profile from the host device in response to the external management entity instantiating the virtual resource on the host device via a signal sent to the host device via a data path independent of the network management module.

21. A method, comprising
receiving, from an external management entity, a provisioning instruction including a device identifier;
receiving at a first time the device identifier and a first network location descriptor of a virtual resource from a first network device;
associating at a second time after the first time the provisioning instruction with the first network location descriptor based on the device identifier such that the first network device can provision a physical port of the first network device associated with the virtual resource at the second time;
receiving at a third time after the second time the device identifier and a second network location descriptor of the virtual resource from a second network device; and
associating at a fourth time after the third time the provisioning instruction with the second network location descriptor based on the device identifier such that the second network device can provision a physical port of the second network device associated with the virtual resource at the fourth time.

22. The method of claim 21, wherein the provisioning instruction is a first provisioning instruction; the method further comprising:
receiving a second provisioning instruction including the device identifier; and
associating at a fifth time after the fourth time the second provisioning instruction with the second network location descriptor based on the device identifier.

23. The method of claim 21, wherein:
the virtual resource is operatively coupled to the first network device at the first time; and
the virtual resource is operatively coupled to the second network device at the third time.

24. The method of claim 21, wherein the virtual resource is operatively coupled to the first network device at the first time and the virtual resource is operatively coupled to the second network device at the third time, the method further comprising:
sending before the third time a portion of the provisioning instruction to the first network device based on the provisioning instruction and a portion of the network location descriptor; and
sending after the fourth time a portion of the provisioning instruction to the second network device based on the provisioning instruction and a portion of the second network location descriptor.

25. The method of claim 21, wherein:
the provisioning instruction is received from the external management entity in response to an instantiation of the virtual resource at a host device before the first time.

26. The method of claim 21, further comprising:
storing in a database the device identifier and the first network location descriptor such that the first network location descriptor can be accessed based on the device identifier; and
updating the database such that the second network location descriptor can be accessed based on the device identifier.

27. The method of claim 21, wherein:
the first network location descriptor includes a physical port identifier associated with a physical port of the first network device, a device identifier associated with the first network device, and a device identifier associated with the virtual resource, the physical port of the first network device being operatively coupled to the virtual resource at the first time; and
the second network location descriptor includes a physical port identifier associated with a physical port of the second network device, a device identifier associated with the second network device, and the device identifier associated with the virtual resource, the physical port of the second network device being operatively coupled to the virtual resource at the third time.

28. The method of claim 21, wherein the receiving at the first time is in response to the first network device receiving the device identifier from a host device hosting the virtual resource.

* * * * *

UNITED STATES PATENT AND TRADEMARK OFFICE
CERTIFICATE OF CORRECTION

PATENT NO.       : 8,255,496 B2
APPLICATION NO.  : 12/346623
DATED            : August 28, 2012
INVENTOR(S)      : Shukla et al.

It is certified that error appears in the above-identified patent and that said Letters Patent is hereby corrected as shown below:

Column 21, last line, change "instructions" to --instruction--.

Column 22, line 37, change "a" to --the--.

Column 23, line 6, change "the" to --a--.

Column 24, line 6, after "the" insert --first--.

Signed and Sealed this
Twenty-seventh Day of November, 2012

David J. Kappos
*Director of the United States Patent and Trademark Office*